(12) United States Patent
Ooishi

(10) Patent No.: US 8,395,684 B2
(45) Date of Patent: *Mar. 12, 2013

(54) NOISE REDUCTION APPARATUS, METHOD AND PROGRAM FOR CONTROLLING SAME, IMAGE SENSOR AND DIGITAL CAMERA

(75) Inventor: Makoto Ooishi, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 133 days.

This patent is subject to a terminal disclaimer.

(21) Appl. No.: 12/916,022

(22) Filed: Oct. 29, 2010

(65) Prior Publication Data

US 2011/0038538 A1  Feb. 17, 2011

Related U.S. Application Data

(62) Division of application No. 11/704,344, filed on Feb. 9, 2007, now Pat. No. 7,847,838.

(30) Foreign Application Priority Data

Feb. 22, 2006 (JP) .................................. 2006-045392
May 2, 2006 (JP) .................................. 2006-128056

(51) Int. Cl.
H04N 9/73 (2006.01)
H04N 5/217 (2011.01)
H04N 9/07 (2006.01)
G06K 9/00 (2006.01)

(52) U.S. Cl. ..................... 348/241; 348/223.1; 348/337; 382/167

(58) Field of Classification Search ................ 348/222.1, 348/223.1, 225.1, 241, 337; 382/162, 167, 382/260–262

See application file for complete search history.

(56) References Cited

U.S. PATENT DOCUMENTS

| 4,725,880 | A | 2/1988 | Dischert |
| 5,777,673 | A | 7/1998 | Yoshikawa |
| 6,571,012 | B1 | 5/2003 | Pettigrew |
| 7,564,490 | B2 | 7/2009 | Ooishi |
| 7,586,525 | B2 | 9/2009 | Tamaru et al. |
| 7,847,838 | B2 * | 12/2010 | Ooishi .......................... 348/241 |
| 2001/0052941 | A1 | 12/2001 | Matsunaga et al. |
| 2002/0113885 | A1 | 8/2002 | Inoue et al. |
| 2002/0186873 | A1 | 12/2002 | Sasada |
| 2003/0025813 | A1 | 2/2003 | Yoshiwara et al. |
| 2006/0039039 | A1 | 2/2006 | Ooishi |
| 2008/0273100 | A1 | 11/2008 | Oishi |

FOREIGN PATENT DOCUMENTS

| JP | 2002-222416 A | 8/2002 |
| JP | 2004-235472 A | 8/2004 |
| JP | 2005-303731 A | 10/2005 |
| JP | 2006060660 A | 3/2006 |

* cited by examiner

Primary Examiner — Daniel M Pasiewicz
(74) Attorney, Agent, or Firm — Birch, Stewart, Kolasch & Birch, LLP

(57) ABSTRACT

Image data pixels indicative of the pixels in a noise-reduction target area having a size of 5×5 pixels is extracted from a plurality of types of CCD-RAW data having red, green and blue color components. A filter for reducing uncorrelated noise is calculated. Uncorrelated noise is removed by performing a filter operation using the calculated filter while correlativity of the CCD-RAW data is maintained. These processing steps are repeated for one frame of CCD-RAW data. After uncorrelated noise has been removed, spatial pixel processing such as an aperture correction is applied.

3 Claims, 30 Drawing Sheets

NOISE REDUCTION APPARATUS, METHOD AND PROGRAM FOR CONTROLLING SAME, IMAGE SENSOR AND DIGITAL CAMERA

This application is a Divisional of co-pending application Ser. No. 11/704,344, filed on Feb. 9, 2007, the entire contents of which are hereby incorporated by reference and for which priority is claimed under 35 U.S.C. §120.

BACKGROUND OF THE INVENTION

1. Field of the Invention

This invention relates to a noise reduction apparatus, a method and program for controlling this apparatus, and an image sensing device and digital camera having this apparatus.

2. Description of the Related Art

CCDs used in digital still cameras are continuing to be improved in terms of number of pixels and sensitivity. The influence of noise, therefore, has become a problem.

Using a low-pass filter or median filter, etc., to remove noise from a video signal obtained by image sensing has been considered (see the specification of Japanese Patent Application Laid-Open No. 2004-235472). The removal of noise from an image without detracting from image sharpness has also been considered (see the specification of Japanese Patent Application Laid-Open No. 2002-222416). There is also prior art for detecting an edge based upon neighboring pixels and suppressing a decline in resolution (see the specification of Japanese Patent Application Laid-Open No. 2005-303731).

It is still difficult, however, to remove noise completely.

SUMMARY OF THE INVENTION

Accordingly, an object of the present invention is to reduce noise.

According to a first aspect of the present invention, the foregoing object is attained by providing a noise reduction apparatus comprising: a noise removal device (means) for removing uncorrelated noise contained in a plurality of types of color image data while maintaining correlativity of each of the items of color image data in the plurality of types of color image data, which represent substantially identical color images of a subject obtained by sensing the image of the same subject using a plurality of solid-state electronic image sensing devices; and a pixel processing device (means) for executing spatial pixel processing with regard to the plurality of types of color image data from which uncorrelated noise has been removed by the noise removal device.

The first aspect of present invention also provides a control method suited to the noise reduction apparatus described above. Specifically, the present invention provides a method of controlling a noise reduction apparatus comprising the steps of: removing uncorrelated noise contained in a plurality of types of color image data while maintaining correlativity of each of the items of color image data in the plurality of types of color image data, which represent substantially identical color images of a subject obtained by sensing the image of the same subject using a plurality of solid-state image sensing devices; and executing spatial pixel processing with regard to the plurality of types of color image data from which uncorrelated noise has been removed.

The first aspect of present invention also provides a program for executing the above-mentioned noise reduction processing, as well as an image sensor and digital camera having the noise reduction apparatus described above.

In accordance with the first aspect of the present invention, a plurality of types of color image data representing substantially identical color images of a subject obtained by sensing the image of the same subject using a plurality of solid-state image sensing devices are obtained. Uncorrelated noise contained in the plurality of types of color image data is removed while maintaining correlativity of each of the items of color image data in the plurality of types of color image data. Spatial pixel processing is applied to the plurality of types of color image data from which uncorrelated noise has been removed. Uncorrelated noise is removed before spatial pixel processing is executed. Therefore, in comparison with a case where uncorrelated noise is removed after spatial pixel processing is executed, noise reduction processing can be achieved without dependence on circuitry such as a signal processing circuit that operates after execution of spatial pixel processing. Spatial pixel processing refers to signal processing (interpolation processing, processing for changing pixel level utilizing weighting, digital filter processing, etc.) which, using pixels that form the image of a subject, is applied to other pixels forming the image of the subject. Use may be made of one of the pixels, which form one of the images of a subject among a plurality of types of subject images represented by a plurality of types of color image data, to execute signal processing with regard to the other pixels that form this one image of the subject, or to execute signal processing with regard to other pixels that form another image of a subject different from the one image of the subject.

The plurality of types of color image data may have color components that are different from one another.

The plurality of color images of the subject represented by the plurality of types of color image data is such that phase characteristics (a characteristic representing spatial position; a characteristic indicating a deviation in position in a case where a plurality of images of the subject are superimposed) of the pixels that form respective ones of the plurality of color images of the subject are identical or exhibit a deviation of less than pixel pitch, by way of example.

The apparatus may further comprise a noise removal processing suppression device for suppressing noise removal processing by the noise removal device in accordance with the level of color image data.

It may be so arranged that uncorrelated noise removal processing in the noise removal device is executed with regard to at least one of a characteristic of the solid-state electronic image sensing devices and shooting information used when a subject is shot using the solid-state electronic image sensing devices.

The plurality of types of color image data may have color components that are different from one another. In this case, the noise removal device includes, by way of example, a color image data shifting device (means) for shifting the levels of the plurality of types of color image data in such a manner that an average value of the levels of the plurality of types of color image data will become the position of the origin of color space of the plurality of color components; a filtering device (means) for subjecting color image data, which has been shifted by the color image data shifting device, to processing for removing uncorrelated noise in accordance with the level of this color image data; and a color image data reverse shifting device (means) for returning, in accordance with the amount of shift, the level of the color image data from which uncorrelated noise has been removed by the filtering device.

Noise removal processing in the filtering device is, e.g., digital filtering processing that utilizes calculation conforming to the number of the plurality of color components.

Noise removal processing in the filtering device is, e.g., digital filtering processing for handling the plurality of color components in such a manner that the number of the plurality of color components will become less than the original number of color components, with use being made of calculation conforming to the number of the plurality of color components.

The apparatus may further comprise a noise removal processing halting device (means) for halting noise removal processing in a case where the operation in the digital filter processing has diverged.

The apparatus may further comprise an image data dividing device (means) for dividing (classifying) the plurality of types of color image data into a plurality of color image data groups including color image data exhibiting correlativity with one another. Color image group has correlativity, since the color image group contains the plurality of color image data exhibiting correlativity with one another. In this case, the color image data shifting device would shift a color image data group (or color image data groups), which contains color image data that is to undergo removal of uncorrelated noise, from among the plurality of color image data groups obtained by division in the image data dividing device.

The image data dividing device may include a small-block dividing device (means) for dividing (classifying) the plurality of types of color image data into a plurality of small blocks. In this case, each of the plurality of small blocks obtained by division in the small-block dividing device would be divided (classified) into a plurality of color image data groups exhibiting correlativity.

The plurality of small blocks may be divided (classified) into a plurality of color image data groups exhibiting correlativity, based upon the average pixel level of the small blocks obtained by division by the small-block dividing device.

The plurality of small blocks may be divided (classified) into a plurality of color image data groups exhibiting correlativity, based upon a pixel level obtained by application of a weighted mean to each of the pixels forming the small blocks obtained by division in the small-block dividing device, the weighted mean using weighting coefficients such that the pixel level becomes the average pixel level as sensitivity of image sensing increases, and becomes a representative-pixel level of pixels forming the small blocks as sensitivity decreases.

It can also be so arranged that the plurality of small blocks are divided (classified) into a plurality of color image data groups exhibiting correlativity, based upon representative pixels that constitute the small blocks.

The apparatus may further comprise a noise removal halting device for halting uncorrelated noise removal processing by the noise removal device in a case where the size of an image area represented by the color image data group obtained by division in the image data dividing device is less than a first predetermined value.

In a case where the size of an image area represented by the color image data group is equal to or greater than a second predetermined value larger than the first predetermined value, a color image data group is shifted, this group being one which contains color image data that is to undergo removal of uncorrelated noise from among the plurality of color image data groups obtained by division in the image data dividing device.

Preferably, in a case where the size of an image area represented by the color image data group is equal to or greater than a third predetermined value larger than the second predetermined value, uncorrelated noise removal processing by the noise removal device is halted and noise in each item of color image data is removed based upon the difference between a dispersion value of each item of color image data containing noise and a dispersion value of the noise.

The apparatus may further comprise a luminance data generating device (means) for generating luminance data from the color image data. In this case, the color image data dividing device would divide (classify) the luminance data, which has been generated by the luminance data generating device, into a plurality of luminance data groups, which exhibit correlativity.

The apparatus may further comprise a block dividing device (means) for dividing (classifying) the color image data of respective ones of the plurality of items of color image data into a plurality of close-together blocks in color space; and a level difference calculation device (means) for a calculating level difference with respect to a central pixel among pixels that constitute each of the blocks obtained by division by the block dividing device. In this case, image data, which represents a collection of pixels for which level difference calculated by the level difference calculation device is less than a predetermined value, would be shifted.

The level difference calculation device may include: a detection device (means) for detecting the direction in which the slope of a neighboring area, which contains a target pixel for which the level difference with respect to the center pixel is calculated, is low; and an average level calculation device (means) for calculating an average level of pixels, inclusive of the target pixel, that are present in the direction of the low slope is detected to be low by the detecting device. In this case, a level difference between the average level calculated by the average level calculation device and the level of the target pixel is calculated by the level difference calculation device.

The detecting device may include a high-pass filter for extracting high-frequency components in the vertical direction, horizontal direction, northwest direction and northeast direction of the target pixel and pixels around the target pixel. In this case, the direction in which the slope is low is detected by the detecting device based upon the high-frequency components extracted by the high-pass filter device.

According to a second aspect of the present invention, the foregoing object is attained by providing a noise reduction apparatus comprising: a dividing device (means) for dividing (classifying) color image data representing one frame of a color image into a plurality of blocks in which pixels are spatially close together; a calculation device (means) for calculating a difference between a dispersion value of block color image data representing an image in a block obtained by division in the dividing device and a dispersion value of noise in the block color image data; a noise removal device (means) for removing noise in the color image data based upon the difference calculated by the calculation device; and a control device (means) for exercising control in such a manner that calculation processing by the calculation device and noise removal processing in the noise removal device will be repeated with regard to the color image data representing one frame of the color image.

The second aspect of present invention also provides a control method suited to the noise reduction apparatus described above. Specifically, the present invention provides a method of controlling a noise reduction apparatus comprising the steps of: dividing (classifying) color image data representing one frame of a color image into a plurality of blocks in which pixels are spatially close together; calculating a difference between a dispersion value of block color image data representing an image in a block obtained by division and a dispersion value of noise in the block color image data;

removing noise in the color image data based upon the difference calculated; and repeating difference calculation processing and noise removal processing with regard to the color image data representing one frame of the color image.

The second aspect of present invention also provides a program for implementing the above-described method of controlling the noise reduction apparatus.

In accordance with the second aspect of the present invention, one frame of a color image is divided into a plurality of blocks in which pixels are spatially close together. The difference between the dispersion value of block color image data (inclusive of noise), which represents the image in the block, and a dispersion value of noise in the block color image data is calculated. Noise in the color image data is removed based upon the difference calculated. Such difference calculation processing and noise removal processing is repeated for the equivalent of one frame. In a case where noise reduction has been performed taking color correlation into account, there are instances where noise cannot be removed effectively when color correlation happens to occur accidentally. In accordance with the second aspect of the present invention, however, the fact that color correlation regarding color image data is not taken into consideration means that it is possible to prevent noise from not being removed owing to the presence of color correlation.

According to a third aspect of the present invention, the foregoing object is attained by providing a noise reduction apparatus comprising: an extraction device (means) for inputting image data representing one frame of an image constituted by a number of pixels and extracting image data representing a pixel within a zone in which the color image data is regarded as having correlativity; a noise removal device (means) for removing uncorrelated noise while maintaining correlativity of the image data extracted by the extraction device; and a control device (means) for exercising control in such a manner that extraction processing by the extraction device and noise removal processing by the noise removal device is repeated with regard to the image data representing one frame of the image.

The third aspect of present invention also provides a control method suited to the noise reduction apparatus described above. Specifically, the present invention provides a method of controlling a noise reduction apparatus comprising the steps of: inputting image data representing one frame of an image constituted by a number of pixels and extracting image data representing a pixel within a zone in which the color image data is regarded as having correlativity; removing uncorrelated noise while maintaining correlativity of the image data extracted; and exercising control in such a manner that extraction processing and noise removal processing is repeated with regard to the image data representing one frame of the image.

The third aspect of present invention also provides a program for implementing the above-described method of controlling the noise reduction apparatus.

In accordance with the present invention, image data representing an image within a zone in which the color image data is regarded as having correlativity is extracted. Uncorrelated noise is removed while correlativity of the extracted image data is maintained. Since uncorrelated noise is removed in a state in which correlativity is maintained, circuitry that executes image processing with regard to image data in a state in which the correlativity thereof is maintained can be utilized subsequently. The image data may be monochrome image data or may be monochromatic color image data obtained from each of three solid-state electronic image sensing devices.

BRIEF DESCRIPTION OF THE DRAWINGS

FIG. 22 is a flowchart illustrating processing for area discrimination and the like;
FIG. 23 is a flowchart illustrating part of processing for area discrimination and the like.

DESCRIPTION OF THE PREFERRED EMBODIMENTS

A preferred embodiment of the present invention will now be described in detail with reference to the drawings.

The principles of noise reduction processing according to a preferred embodiment of the invention will be described first.

In this embodiment, use is made of an image sensor that internally accommodates CCDs on three chips (the number of chips need not necessarily be three, and it will suffice if there are a plurality of CCD chips).

Figure 1:
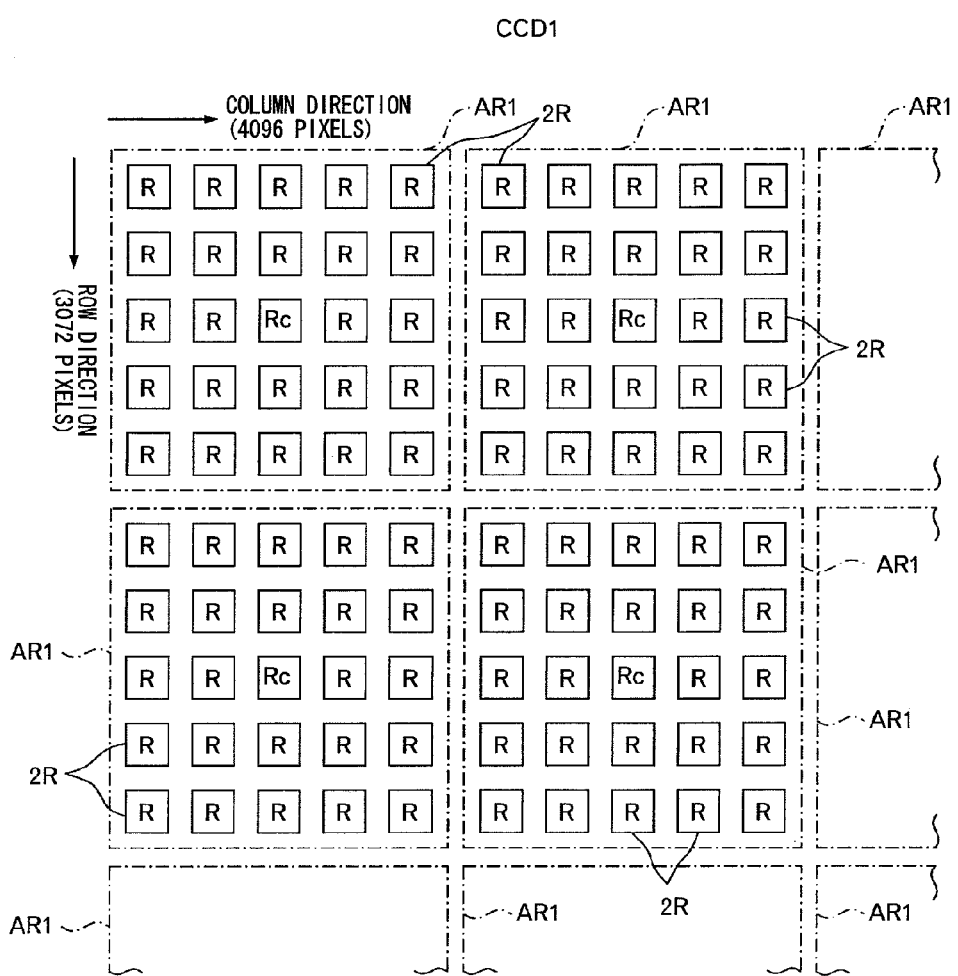
FIG. 1 illustrates part of the photoreceptor surface of a CCD.
Figure 2:
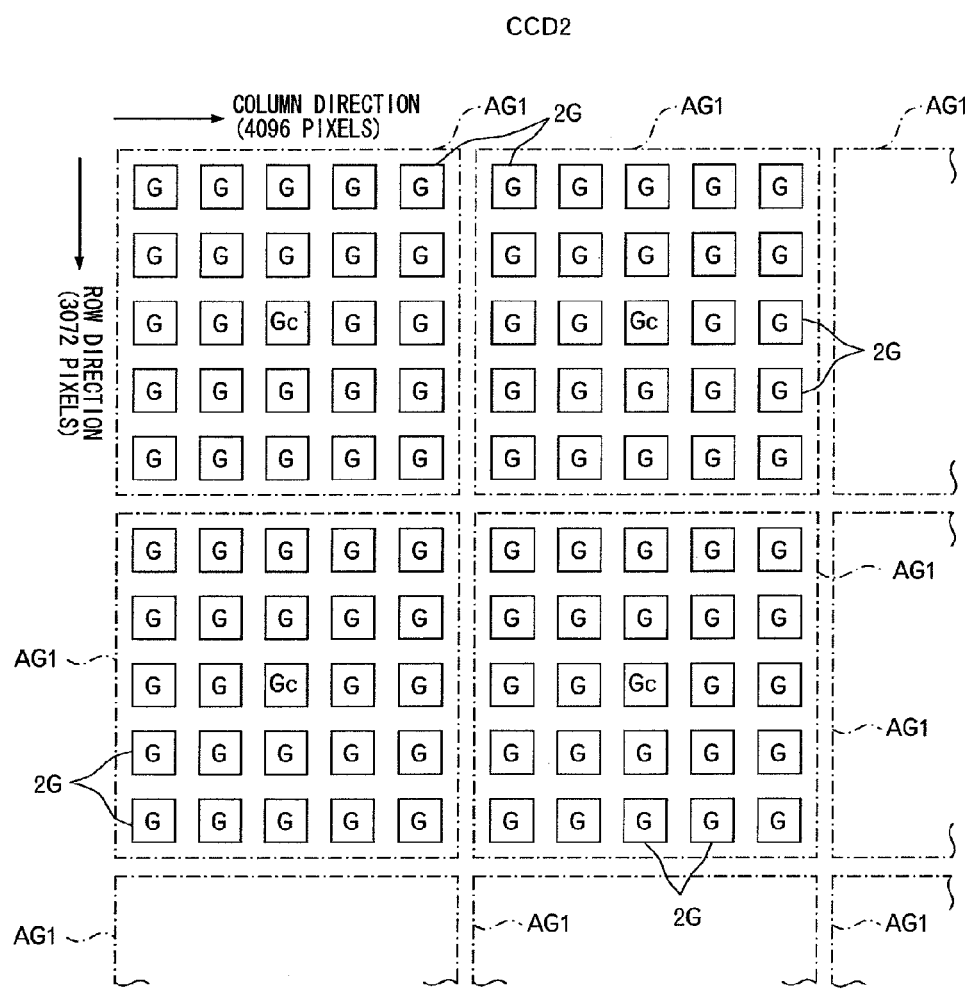
FIG. 2 illustrates part of the photoreceptor surface of a CCD.
Figure 3:
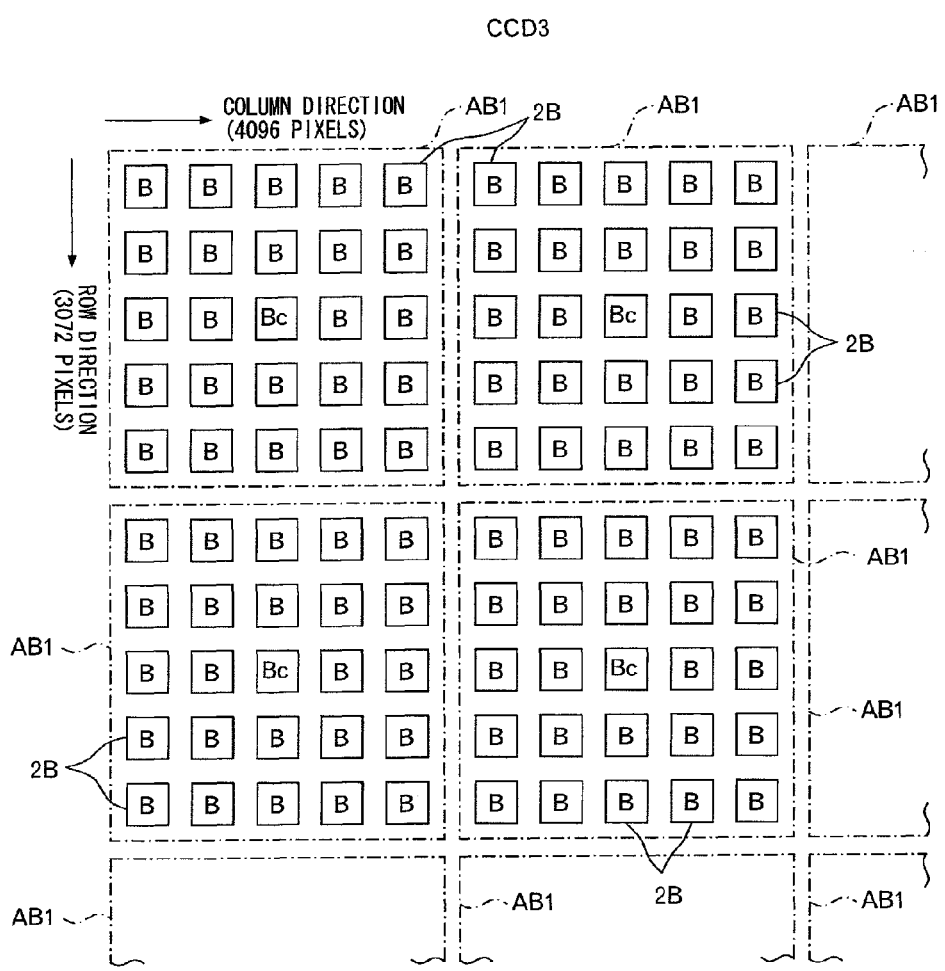
FIG. 3 illustrates part of the photoreceptor surface of a CCD.

FIGS. 1 to 3 illustrate parts of the photoreceptor surfaces of CCDs on three chips constructing the image sensor. FIG. 1 illustrates part of the photoreceptor surface of a first CCD that outputs a video signal of a red color component, FIG. 2 illustrates part of the photoreceptor surface of a second CCD that outputs a video signal of a green color component, and FIG. 3 illustrates part of the photoreceptor surface of a third CCD that outputs a video signal of a blue color component.

As shown in FIG. 1, 4096 photodiodes 2R are disposed in the column direction of the first CCD 1 and 3072 photodiodes 2 in the row direction thereof. Image data representing the image of a subject composed of 4096 pixels in the column direction and 3072 pixels in the row direction is obtained by sensing the image of the subject using the first CCD 1. The video signal obtained from each photodiode 2R corresponds individually to each pixel of the image.

Formed on the photoreceptor surface of each photodiode 2R of the multiplicity thereof is a color filter having a characteristic that passes the red color component. In order to indicate that the filter is one that passes the red color component, the photodiode 2R is assigned the character "R".

In this embodiment, noise reduction processing is executed using an area (a noise-reduction target area AR1), which is composed of five photodiodes 2R in each of the column and row directions, for a total of 25 photodiodes 2R, as a single unit.

When the image of the subject is sensed using the first CCD, the first CCD outputs CCD-RAW data representing the red-component image of the subject. The CCD-RAW data appears serially one row's worth of the photodiodes 2R at a time.

As shown in FIGS. 2 and 3, here also 4096 photodiodes 2G and 2B and 3072 of these photodiodes 2G and 2B are disposed in the column and row directions, respectively, of the second and third CCDs 2 and 3, respectively. Video signals representing respective ones of subject images having 4096 pixels in the column direction and 3072 pixels in the row direction are obtained by sensing the image of the subject using the second and third CCDs. The video signals obtained from respective ones of the photodiodes 2G and 2B correspond individually to each pixel of the images.

Formed on the photoreceptor surfaces of each of the photodiodes 2G and 2B of the multiplicity of photodiodes 2G and 2B are color filters having characteristics that pass the green and blue components, respectively. In order to indicate that the filters are ones that pass the green and blue color components, the photodiodes 2G and 2B are assigned the characters "G" and "B", respectively.

In this embodiment, the areas of 25 photodiodes 2G and 2B each composed of five diodes in each of the column and row directions are illustrated as noise-reduction target areas AG1 and AB1, respectively.

When the image of the subject is sensed using the second and third CCDs, CCD-RAW data representing the green-component image of the subject is obtained from the second CCD, and CCD-RAW data representing the blue-component image of the subject is obtained from the third CCD.

Pixels Rc, Bc and Gc at the centers of the noise-reduction target areas AR1, AB1 and AG1, respectively, are pixels that are to undergo noise reduction. As will be described later in greater detail, noise reduction processing of the center pixels Rc, Bc, and Gc is executed utilizing the pixels (image data) present in the noise-reduction target areas AR1, AB1 and AG1. When noise reduction processing of the center pixels Re, Bc and Gc of the noise-reduction target areas AR1, AB1 and AG1, respectively, ends, the noise-reduction target areas AR1, AB1 and AG1 are each shifted one pixel to the right and noise reduction processing is applied to the pixels Rc, Bc and G1$c$ located at the centers of respective ones of the noise-reduction target areas AR1, AB1 and AG1 thus shifted. Shifting of the noise-reduction target areas and noise reduction processing are thus repeated for one frame of the image.

Since the first to third CCDs shown in FIGS. 1 to 3 are CCDs on three chips constituting the image sensor, the photodiodes 2R, 2G and 2B constructing respective ones of the CCDs are considered to be present at the same position spatially. The pixels represented by the image data obtained from each of the photodiodes 2R, 2G and 2B represent the same location in the images of the subject. In consideration of the fact that the pixels representing the subject images of the three types of color components obtained from the first to third CCDs, namely the red-component pixel (obtained from a photodiode 2R of the first CCD) forming the red-component image of the subject, the green-component pixel (obtained from a photodiode 2G of the second CCD) forming the green-component image of the subject and the blue-component pixel (obtained from a photodiode 2B of the third CCD) forming the blue-component image of the subject, are at substantially the same spatial position, a pixel within the noise-reduction target areas AR1, AB1 and AG1 can be expressed by $Xn=(Rn,Gn,Bn)$ (since there are 25 pixels in each of the noise-reduction target areas AR1, AB1 and AG1, $n=1$ to 25 holds).

Figure 4:
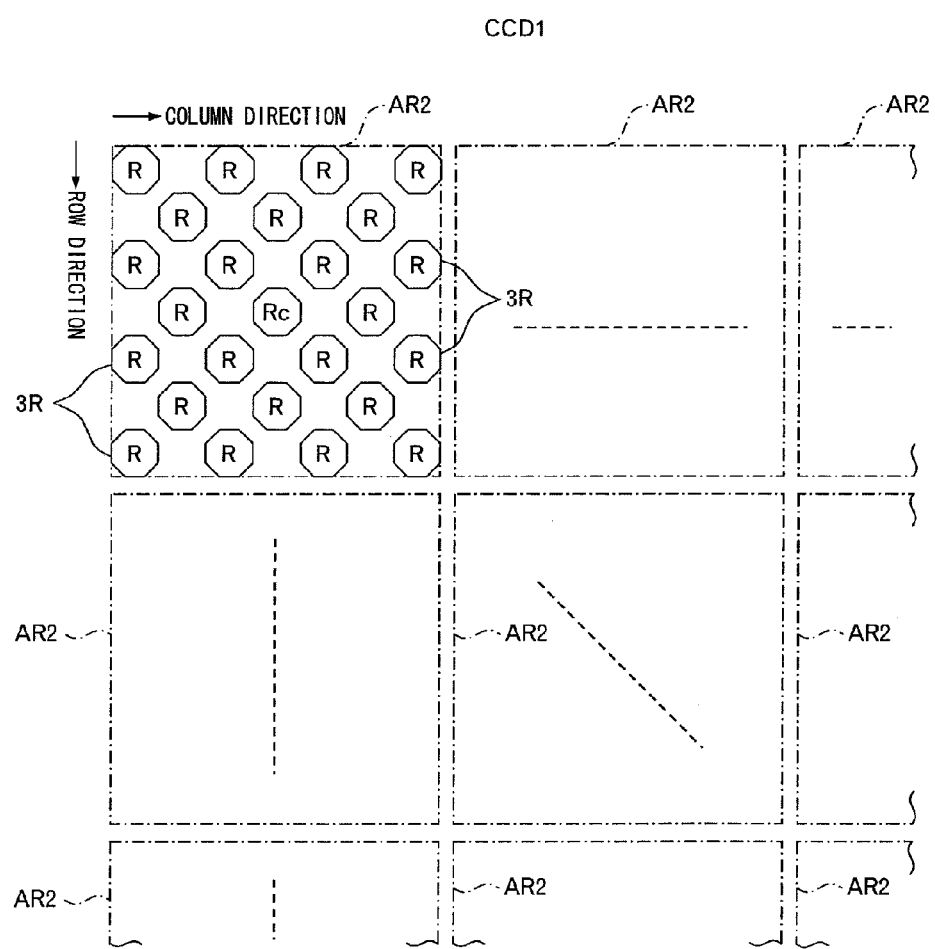
FIG. 4 illustrates part of the photoreceptor surface of a CCD.
Figure 5:
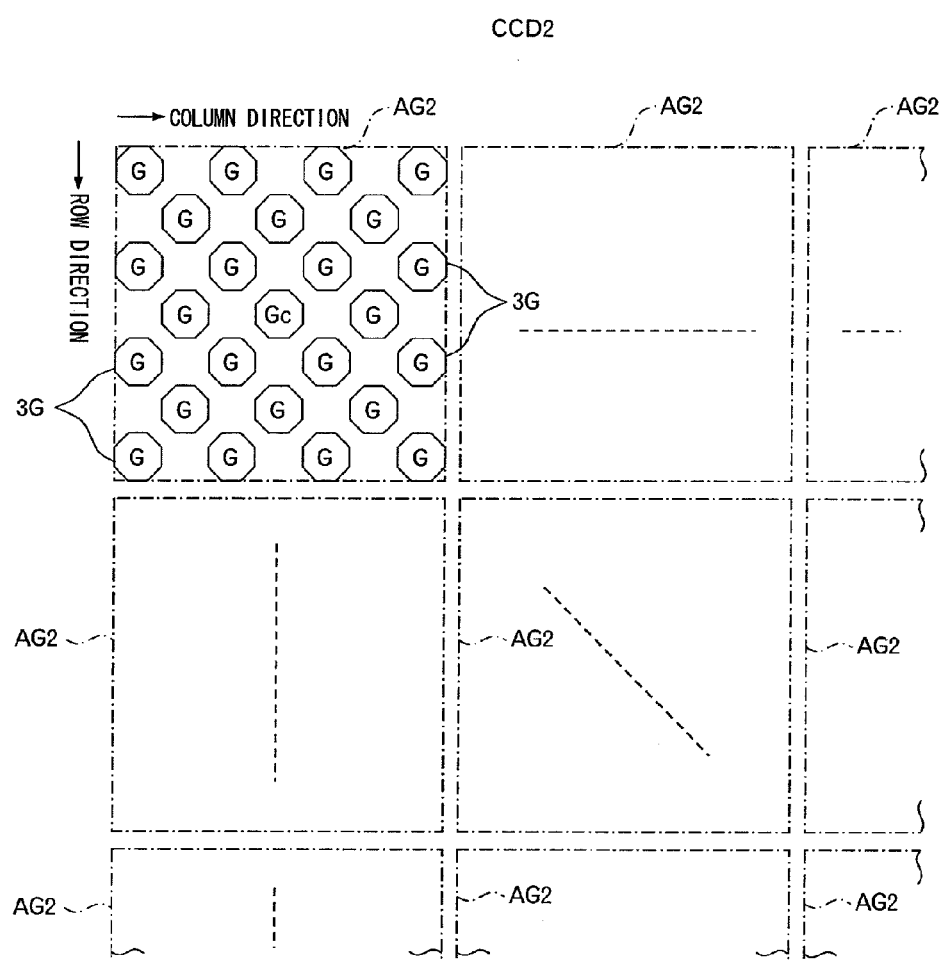
FIG. 5 illustrates part of the photoreceptor surface of a CCD.
Figure 6:
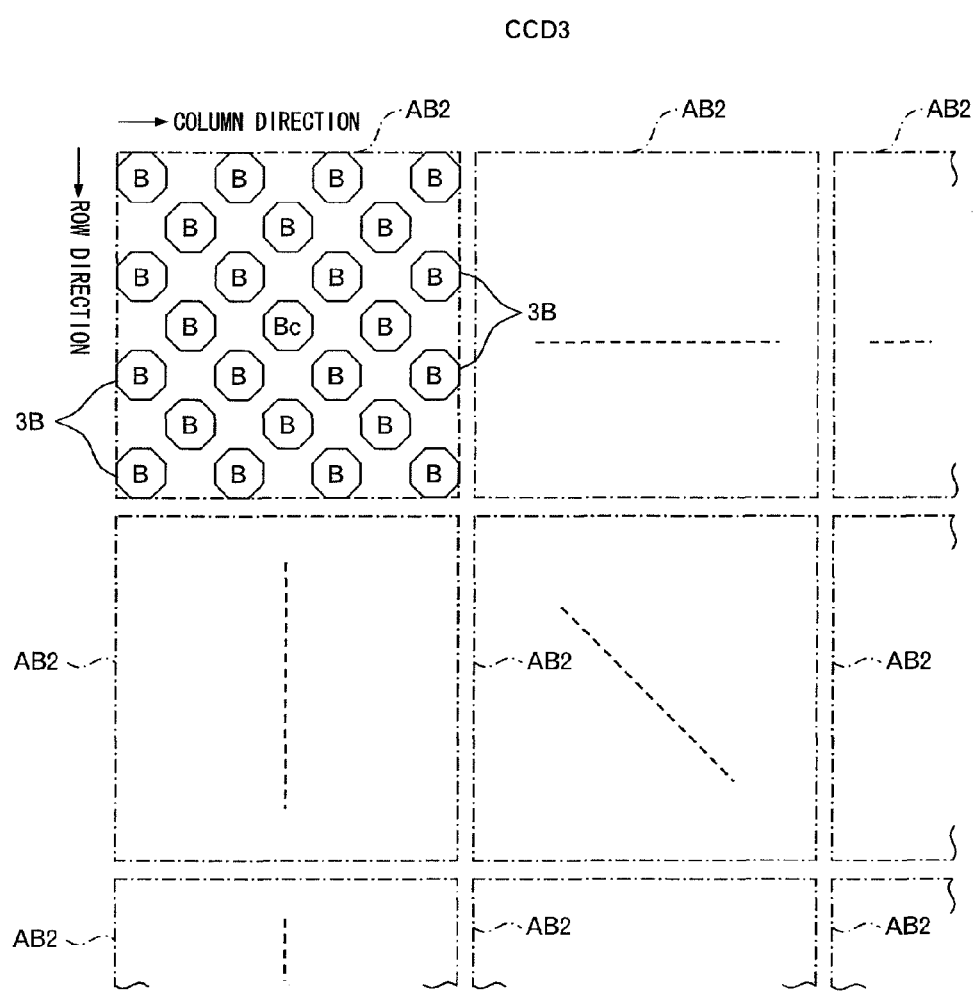
FIG. 6 illustrates part of the photoreceptor surface of a CCD.

FIGS. 4 to 6 illustrate another example of CCD on three chips. This example is a so-called "honeycomb" array. FIG. 4 illustrates part of the photoreceptor surface of a first CCD that outputs a video signal of the red color component, FIG. 5 illustrates part of the photoreceptor surface of a second CCD that outputs a video signal of the green color component, and FIG. 6 illustrates part of the photoreceptor surface of a third CCD that outputs a video signal of the blue color component.

The first to third CCDs illustrated in FIGS. 4 to 6 are such that in odd-numbered rows, the photodiodes 3R, 3G and 3B are arrayed only in the odd-numbered columns, and in even-numbered rows, the photodiodes 3R, 3G and 3B are arrayed only in the even-numbered columns. Alternatively, however, in odd-numbered rows, the photodiodes may be arrayed only in the even-numbered columns, and in even-numbered rows, the photodiodes may be arrayed only in the odd-numbered columns. The first to third CCDs each comprise 4096 columns and 3072 rows, by way of example.

Provided on the photoreceptor surface of each photodiode 3R of the first CCD shown in FIG. 4 is a filter "R" having a characteristic that passes light of the red color component, provided on the photoreceptor surface of each photodiode 3G of the second CCD shown in FIG. 5 is a filter "G" having a characteristic that passes light of the green color component, and provided on the photoreceptor surface of each photodiode 3B of the third CCD shown in FIG. 6 is a filter "B" having a characteristic that passes light of the blue color component. By sensing the image of a subject using the first, second and third CCDs illustrated in FIGS. 4, 5 and 6, respectively, video signals representing subject images of the red, green and blue color components are obtained.

Areas AR2, AG2, AB2 defined in the column and row directions so as to contain the 25 photodiodes 3R, 3G or 3B are stipulated as noise-reduction areas. Pixels Rc, Gc and Bc that are to undergo noise reduction are situated at the approximate centers of the noise-reduction areas AR2, AG2 and AB2, respectively. Noise reduction processing is applied to one frame's worth of an image while the noise-reduction areas AR2, AG2 and AB2 are moved one pixel at a time in the column and row directions in a manner similar to that shown in FIGS. 1 to 3. If the pixels Rc, Gc and Bc that are to undergo noise reduction are situated substantially at the centers of the areas AR2, AG2 and AB2, they need not be centered perfectly. Of course, these pixels can also be set at the central positions perfectly depending upon how the areas AR2, AG2 and AB2 are defined.

As mentioned above, in consideration of the fact that the pixels representing the subject images of the three types of color components obtained from the first to third CCDs, namely the red-component pixel forming the red-component image of the subject, the green-component pixel forming the green-component image of the subject and the blue-component pixel forming the blue-component image of the subject, are at substantially the same spatial position, a pixel within the noise-reduction target areas AR1, AB1 and AG1 can be expressed by Xn=(Rn,Gn,Bn) in the CCDs shown in FIGS. 4 to 6 as well.

The CCDs on the three chips shown in FIGS. 4 to 6 need not be positioned so as to reside perfectly at the same spatial position. For example, even if each CCD is shifted by less than the pixel pitch (the spacing between the photodiodes), it can be regarded as residing at substantially the same spatial position, and noise reduction processing according to this embodiment can be executed in the manner described below.

Figure 7:
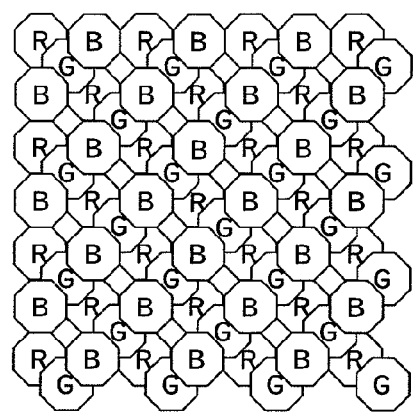
FIG. 7 illustrates the manner in which pixels are staggered.

FIG. 7 illustrates the manner in which the spatial positions of the first to third CCDs shown in FIGS. 4 to 6 are staggered by a distance that is half the pixel pitch.

In a case where the first to third CCDs are superimposed virtually, the photodiodes 3R, 3G and 3B are shifted by a distance that is half the pixel pitch without overlapping one another. Thus, even if the spatial positions of the photodiodes do not coincide perfectly, noise reduction processing described below can be executed so long as they can be considered to be substantially coincide.

FIGS. 8 to 11 illustrate relationships between color space of the red, blue and green color components and image data representing a pixel in a noise-reduction target area.

Figure 8:
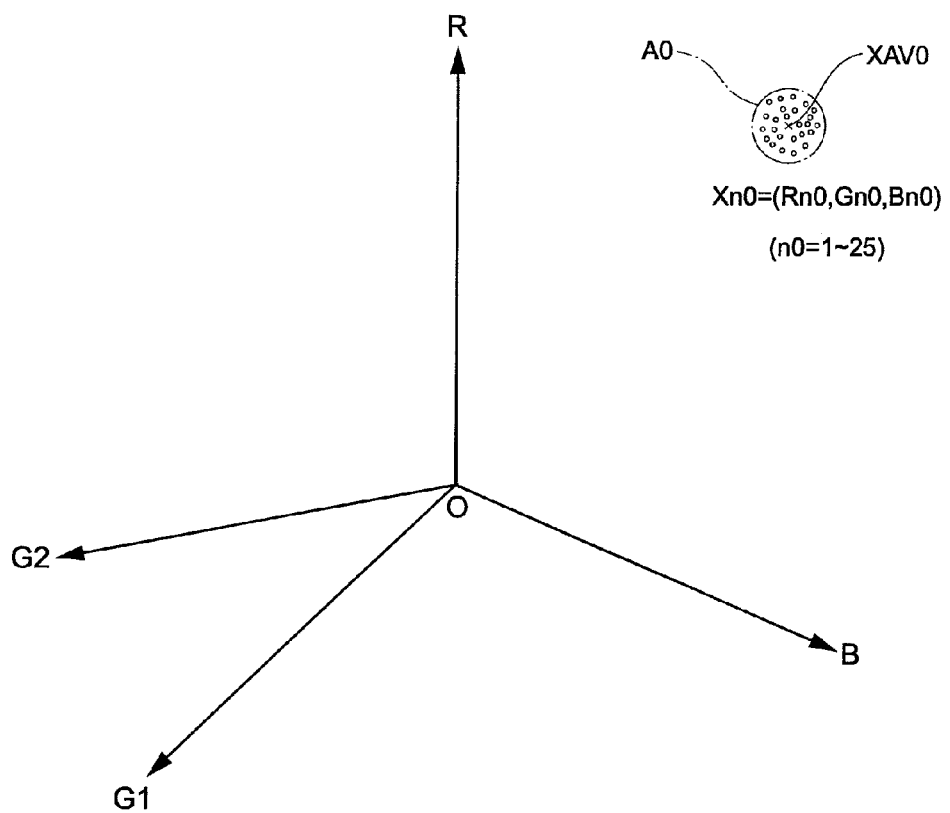
FIG. 8 illustrates the relationship between color space and image data.

FIG. 8 illustrates the relationship between the color space and image data representing a pixel in a noise-reduction target area A0 in a case where there is no uncorrelated noise.

The noise-reduction target area A0 is regarded as one having correlativity. A video signal (image data) representing a pixel Xn0=(Rn0, G1$no$, Bn0, G2$n$0) within the noise-reduction target area A0, therefore, falls within bounds in which the levels of the image data are comparatively consolidated. Average data of pixel Xn0 within the noise-reduction target area A0 is indicated by XAV0.

Figure 9:
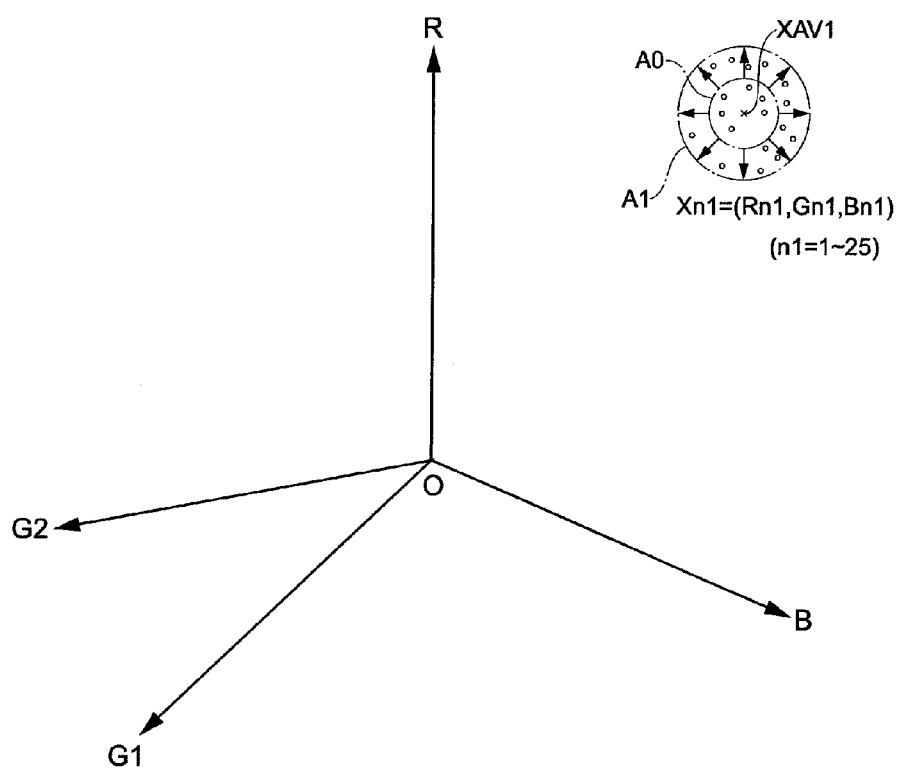
FIG. 9 illustrates the relationship between color space and image data.

FIG. 9 illustrates the relationship between the color space and image data representing a pixel in a noise-reduction target area A1 in a case where uncorrelated noise is present. The noise-reduction target area A0 for the case where there is no uncorrelated noise also is illustrated for the purpose of comparison.

In a case where uncorrelated noise is present, image data representing a pixel Xn1=(Rn1, G1$n$1, Bn1) within the noise-reduction target area A1 is such that the levels of the image data representing each of the pixels are dispersed owing to the uncorrelated noise. Consequently, the zone of the image data representing pixels in the noise-reduction target area A1 in a case where uncorrelated noise is present is broader than the zone of image data representing pixels in the noise-reduction target area A0 in a case where uncorrelated noise is absent.

Further, the average data of pixel Xn1 in the noise-reduction target area A1 is indicated by XAV1.

Noise reduction processing according to this embodiment eliminates uncorrelated noise.

Figure 10:
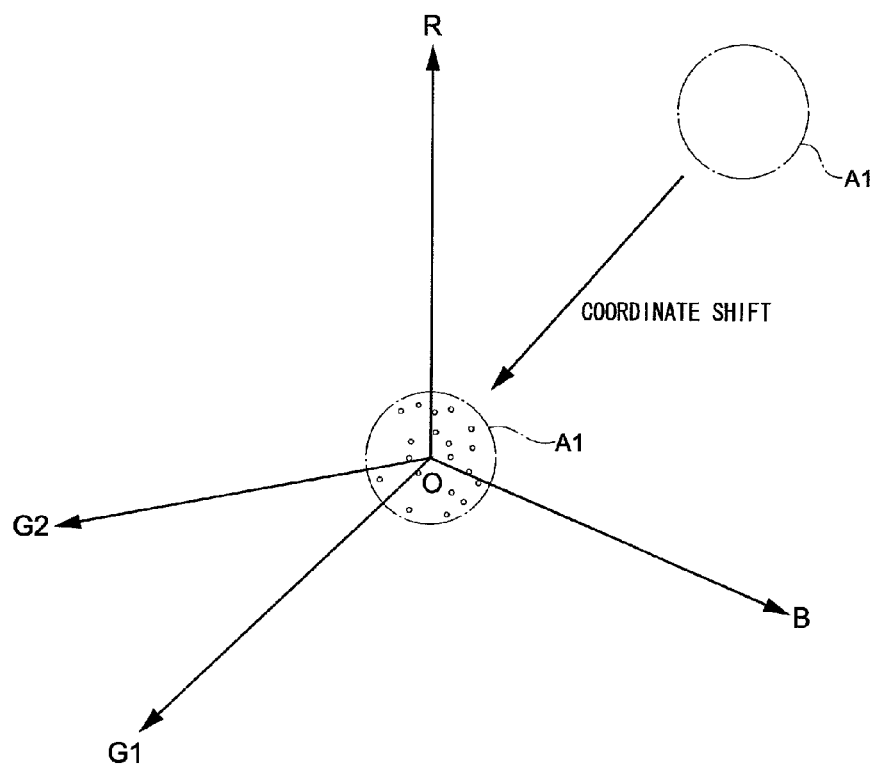
FIG. 10 illustrates the relationship between color space and image data.

FIG. 10 illustrates the relationship between the color space and image data representing a pixel in the noise-reduction target area A1 at the time of movement of image-data coordinates and filtering for removal of noise.

In a case where noise reduction is executed in this embodiment, all of the image data representing pixel Xn1 in noise-reduction target area A1 undergoes a coordinate shift (level shift) in such a manner that the level of the average data XAV1 of pixel Xn1 in noise-reduction target area A1 will become the origin of the color space. Filtering serving as noise reduction processing is applied to the image data representing the pixel Xn1 in the noise-reduction target area A1 in a state in which all of the image data representing pixel Xn1 in noise-reduction target area A1 has undergone a coordinate shift in such a manner that the average data XAV1 is shifted to the origin position. Since filtering is applied with the average data XAV1 as the position of the origin, comparatively appropriate filtering can be performed.

Figure 11:
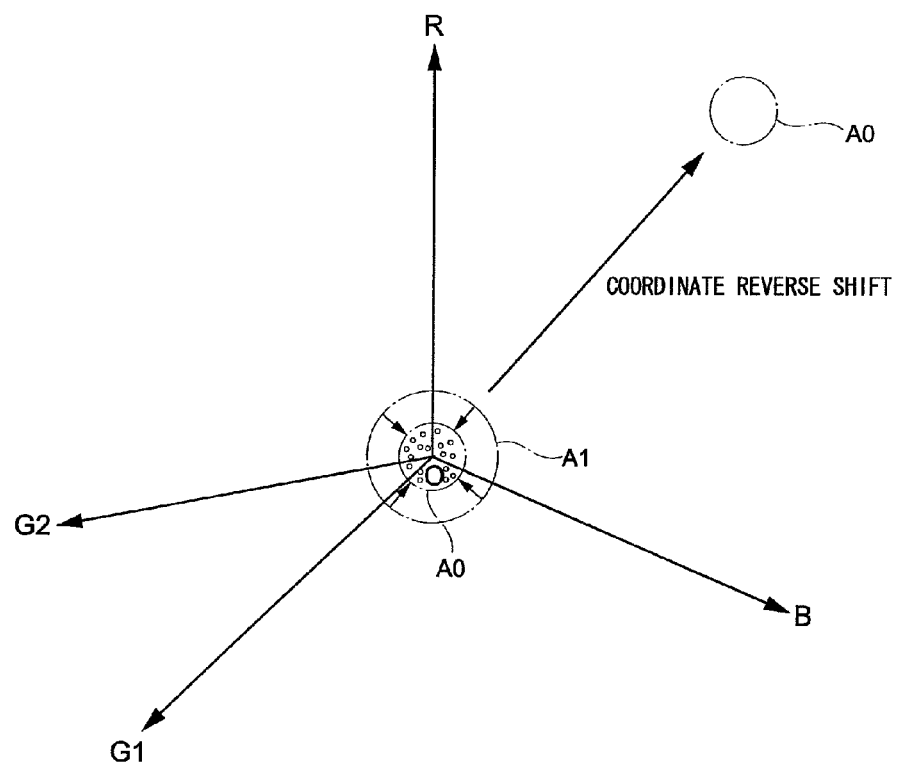
FIG. 11 illustrates the relationship between color space and image data.

FIG. 11 illustrates the relationship between the color space and image data representing a pixel in the noise-reduction target area A1 at the time of reverse movement of image-data coordinates.

The above-described filtering processing eliminates uncorrelated noise. Owing to this filtering processing, the zone of image data representing a noise-reduction target pixel within the noise-reduction target area A1 falls within (approaches) the zone of image data representing a pixel within the noise-reduction target area A0 in a case where there is no uncorrelated noise. By repeating similar processing also with regard to the remaining pixels in the noise-reduction target area A1, all of the pixels in the noise-reduction target area A1 fall within (approach) the zone of the image data representing pixels in the noise-reduction target area A0.

After the image data representing the pixel Xn1 in the noise-reduction target area A1 is subjected to filtering as noise reduction processing in a state in which all of the image data representing the pixel Xn1 in the noise-reduction target area A1 has had its coordinates shifted, as mentioned above, a coordinate reverse-shift (a level reverse-shift) is performed in such a manner that the average data XAV1 returns to the position that prevailed prior to the shift of coordinates. Noise reduction processing is thus completed.

Figure 12:
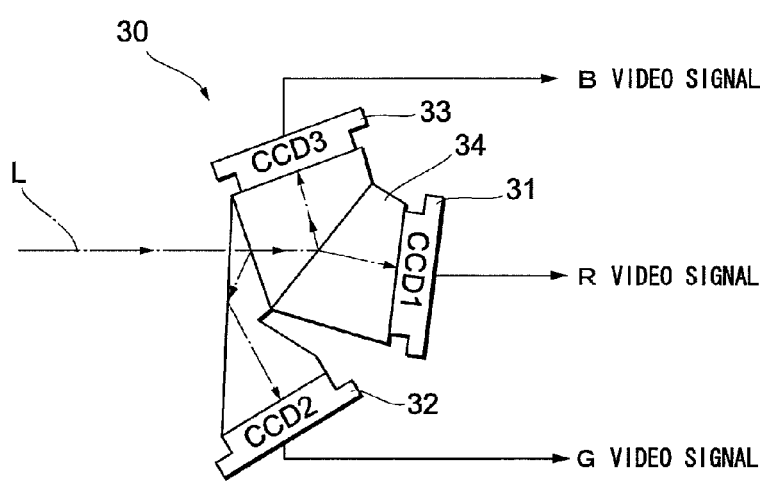
FIG. 12 illustrates the structure of an image sensor.

FIG. 12 illustrates an example of an image sensor 30 used in a digital still camera according to this embodiment.

The image sensor 30 includes three CCDs 31, 32 and 33. The three CCDs 31, 32 and 33 are secured to a separating prism 34 that splits incident light into three portions.

When a light beam L representing the image of a subject impinges upon the image sensor 30, the light beam L is introduced to the separating prism 34. The light beam L is split in three directions by the separating prism 34 so as to impinge upon the photoreceptor surfaces of the first, second and third CCDs, 31, 32 and 33, respectively.

Provided on the photoreceptor surface of each photodiode of the first CCD 31 is a filter that passes the red light component, as illustrated in FIG. 1 or FIG. 4. The first CCD 31 outputs an R video signal representing the red color component image of the subject.

Provided on the photoreceptor surface of each photodiode of the second CCD 32 is a filter that passes the green light component, as illustrated in FIG. 2 or FIG. 5. The second CCD 32 outputs a G video signal representing the green color component image of the subject.

Provided on the photoreceptor surface of each photodiode of the third CCD 33 is a filter that passes the blue light component, as illustrated in FIG. 3 or FIG. 6. The third CCD 33 outputs a B video signal representing the blue color component image of the subject.

Figure 13:
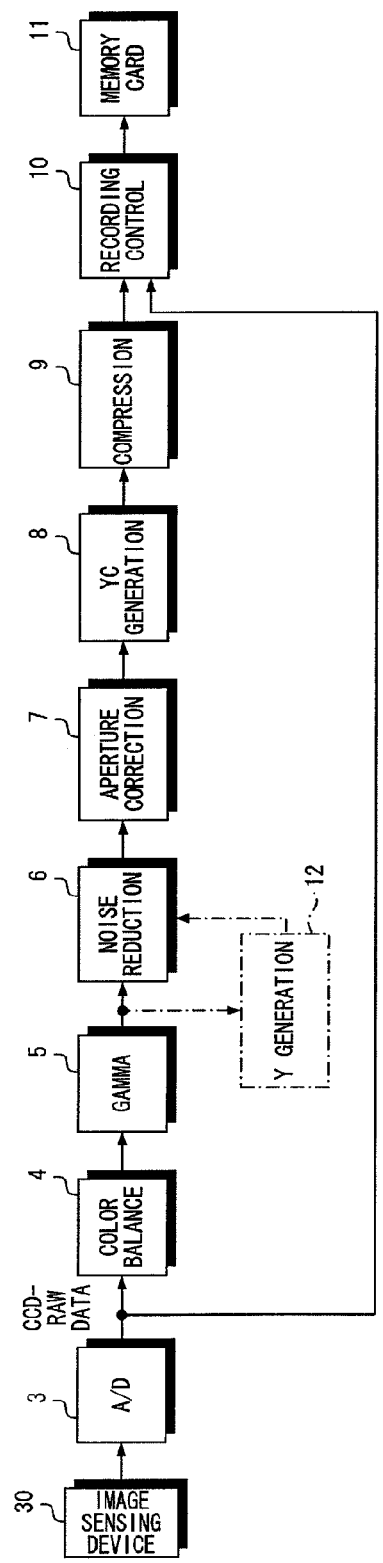
FIG. 13 is a block diagram illustrating the electrical structure of a digital still camera.

FIG. 13 is a block diagram illustrating the electrical structure of a digital still camera in which the above-described noise reduction processing is executed.

The image sensor 30 of the digital still camera uses the arrangement shown in FIG. 12. By sensing the image of a subject, R, G and B video signals are output from the image sensor 30, as described above, and are input to an analog/digital converting circuit 3. The latter outputs the above-mentioned CCD-RAW data of the red, green and blue color components.

In a case where CCD-RAW recording has been set by a recording mode switch (not shown), the CCD-RAW data that has been output from the analog/digital converting circuit 3 is input to a recording control circuit 10. The CCD-RAW data is recorded on a memory card 11 by the recording control circuit 10.

In a case where recording of compressed data has been set by the recording mode switch, the CCD-RAW data that has been output from the analog/digital converting circuit 3 is input to a color balance adjustment circuit 4 and is subjected to a color balance adjustment. The CCD-RAW data that has undergone the color balance adjustment is subjected to a gamma correction in a gamma correction circuit 5 and is then input to a noise reduction circuit 6.

The noise reduction circuit 6 executes noise reduction based upon the above-described principle. The noise reduction processing in noise reduction circuit 6 will be described later in greater detail.

The image data that has been output from the noise reduction circuit 6 is input to an aperture correction (sharpness correction) circuit (a circuit for executing spatial pixel processing in which the relationship of pixel positions changes) 7, and a correction such as emphasis of high-frequency components is applied to the image data. Noise reduction processing for removing uncorrelated noise in a state in which correlativity is maintained ends in the noise reduction circuit 6 before the correction is applied by the aperture correction circuit 7. By performing the correction in the aperture correction circuit 7, therefore, uncorrelated noise is removed even if the correlativity of the image data is lost.

It will suffice if the noise reduction processing by the noise reduction circuit 6 is executed before execution of spatial pixel processing such as the processing executed by the aperture correction circuit 7; the noise reduction processing may be executed before the adjustment in the color balance adjustment circuit 4 or before the correction in the gamma correction circuit 5, etc. Further, the spatial pixel processing is not limited solely to an aperture correction and may include processing for performing resizing that utilizes weighting, processing for reducing noise further using a low-pass filter, etc. Even in a case where these types of processing are executed, it will suffice if noise reduction processing is executed before such processing.

The image data that has been output from the noise reduction circuit 6 is input to a YC generating circuit 8. The latter executes processing for generating luminance data and color difference data. The generated luminance data and color difference data is compressed in a compression circuit 9. The compressed luminance data and color difference data is recorded on the memory card 11 by the recording control circuit 10.

Further, a luminance data generating circuit 12 may be provided in order to generate luminance data from the CCD-RAW data that has been output from the gamma correction circuit 5 and apply noise reduction processing using the luminance data generated. Noise reduction processing utilizing luminance data will be described later in greater detail (see FIGS. 20 and 21).

The amount of noise used in noise reduction processing will be described before the details of noise reduction processing.

Figure 14:
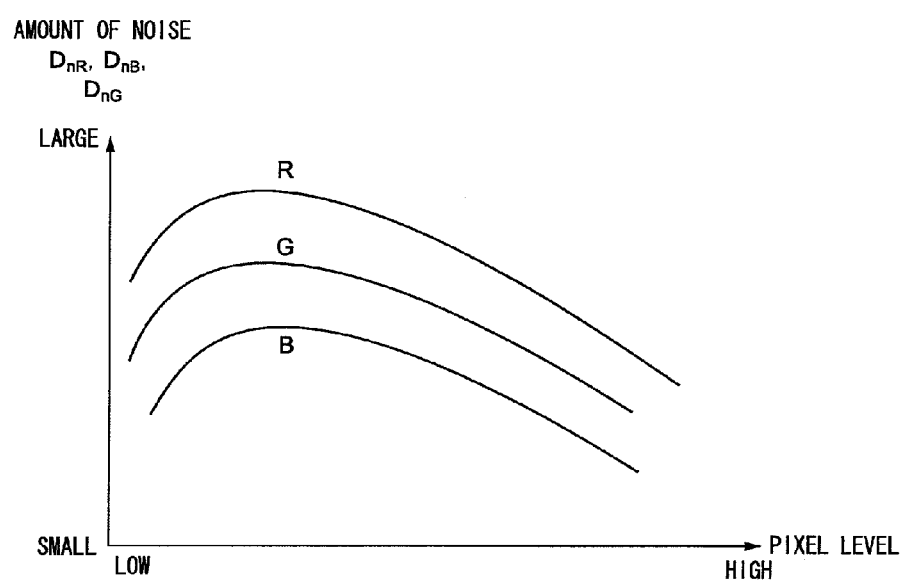
FIG. 14 illustrates the relationship between amount of noise and pixel level.

FIG. 14 illustrates the relationship between amount of noise used in noise reduction processing and pixel values.

In noise reduction processing according to this embodiment, the image of a prescribed reference subject is sensed and an amount Dn of noise is analyzed in advance for every pixel level of each of a red color component, blue color component and green color component.

As the pixel levels of the red color component, blue color component and green color component become greater, noise amounts $D_{nR}$, $D_{nB}$ and $D_{nG}$ of these color components, respectively, gradually increase and peak at certain values. If the pixel values increase further, then the noise amounts $D_{nR}$, $D_{nB}$ and $D_{nG}$ gradually decrease.

This relationship between the noise amounts $D_{nR}$, $D_{nB}$ and $D_{nG}$ and pixel levels of each of the color components is analyzed beforehand and stored. The stored noise amounts $D_{nR}$, $D_{nB}$ and $D_{nG}$ are utilized in noise reduction processing, described later.

Although the above-mentioned noise amounts $D_{nR}$, $D_{nB}$ and $D_{nG}$ can also be utilized as is, gain WBG of the color balance adjustment circuit 4 may be utilized. A noise amount $D_{nG}(\square)$ in a case where the gain WBG of the color balance adjustment circuit 4 is utilized is represented by Equation (1) below.

$$D_{nG}(\square)=D_{nG}\times[WBG]^{\square} \qquad \text{Equation (1)}$$

In Equation (1), the gain WBG of color balance adjustment circuit 4 is multiplied by $\square$ because CCD-RAW data following a $\square$ conversion is subjected to noise reduction processing in this embodiment. It goes without saying that in a case where noise reduction processing is applied to CCD-RAW data prior to the $\square$ conversion, gain WBG not multiplied by $\square$ is utilized. In a case where noise reduction processing is applied to CCD-RAW data before the color balance adjustment, the noise amount $D_{nG}$ itself is utilized.

The noise amounts $D_{nB}(\square)$ and $D_{nR}(\square)$ of the blue and red color components are represented by Equations (2) and (3) below, in which [WBG] in Equation (1) has been replaced by [WBG(R/G)] and [WBG(B/G)], respectively.

$$D_{nR}(\square)=D_{nR}\times[WBG(R/G)]^{\square} \qquad \text{Equation (2)}$$

$$D_{nB}(\square)=D_{nB}\times[WBG(B/G)]^{\square} \qquad \text{Equation (3)}$$

It goes without saying that amounts of noise can be calculated using imaging information other than color balance. Examples of imaging information are the characteristics of the image sensing device such as the image sensor 30, a shading characteristic, ISO sensitivity, $\square$ characteristic, SR combining ratio, dynamic-range characteristic, an automatic sensitivity increase when a flash of light is emitted in a case where use is made of an electronic flash, shutter speed, EV value, LV value, number of recorded pixels, pixel mode, reproduction band, f-stop number, color difference matrix, lens distortion, zoom position, F-value and contour correction value, etc.

Figure 15:
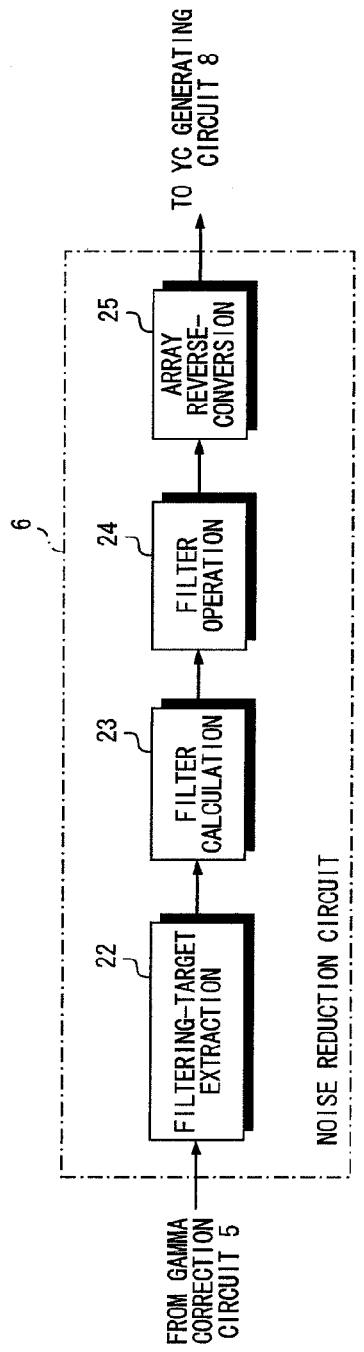
FIG. 15 is a block diagram illustrating the electrical structure of a noise reduction circuit.

FIG. 15 is a block diagram illustrating the electrical structure of the noise reduction circuit 6.

When the CCD-RAW data that has been output from the gamma correction circuit 5 enters the noise reduction circuit 6, the data is input to a filtering-target extraction circuit 22. The latter extracts CCD-RAW data, which represents pixels in noise-reduction target areas each having five pixels in both the column and row directions (these areas are represented as the noise-reduction target areas AR1, AB1 and AG1 in FIGS. 1 to 3), from the CCD-RAW data of every color component.

The CCD-RAW data to undergo filtering is input to a filter calculation circuit 23. The latter calculates a filter F in accordance with Equation (4) below.

$$F = \{D_{(s+n)} - \alpha D_n\} D_{(s+n)}^{-1} \qquad \text{Equation (4)}$$

where $D_{(s+n)}$ in Equation (4) is a quantity that contains a signal and noise and is represented by Equation (5) below. Further, □ is a filter control coefficient.

$$D_{(s+n)} = \begin{bmatrix} D_{(s+n)R} & D_{(s+n)RG} & D_{(s+n)RB} \\ D_{(s+n)GR} & D_{(s+n)G} & D_{(s+n)GB} \\ D_{(s+n)BR} & D_{(s+n)BG} & D_{(s+n)B} \end{bmatrix} \qquad \text{Equation (5)}$$

Here a diagonal component of $D_{(s+n)}$ is amount of variance of the signal of each color, and a non-diagonal component is amount of variance of a signal between colors. $D_{(s+n)x}$(x=R, B, G) is represented by Equation (6) below, and the non-diagonal component $D_{(s+n)x1gx2}$(x1, x2=R, B, G) is represented by Equation (7) below.

Further, Dn in Equation (4) is a quantity solely of noise and is represented by Equation (6) below.

$$D_n = \begin{bmatrix} D_{nR} & 0 & 0 \\ 0 & D_{nG} & 0 \\ 0 & 0 & D_{nB} \end{bmatrix} \qquad \text{Equation (6)}$$

When the filter F is thus calculated, the calculated filter and the CCD-RAW data representing the pixels in the noise-reduction target area are input to a filter operation circuit 24. The latter performs a filter operation (noise reduction processing) that is based on Equation (7) below.

$$\begin{bmatrix} R_{out} \\ G_{out} \\ B_{out} \end{bmatrix} = F \begin{bmatrix} R_c - avR \\ G_c - avG \\ B_c - avB \end{bmatrix} + \begin{bmatrix} avR \\ avG \\ avB \end{bmatrix} \qquad \text{Equation (7)}$$

In Equation (7), Rout, Gout and Bout indicate image data of the red color component, green color component and blue color component, respectively, obtained following the filter operation; Rc, Gc and Bc indicate image data representing noise-reduction target pixels present at the centers of the noise-reduction target areas AR1, AG1 and AB1 of the red color component, green color component and blue color component, respectively, obtained by color-component division processing; and avR, avG and avB are items of data indicating average values of image data of pixels in the noise-reduction target areas AR1, AG1 and AB1 of the red color component, green color component and blue color component, respectively, obtained by color-component division processing.

In Equation (7), the levels of image data of pixels in the noise-reduction target areas AR, AG1 and AB1 are shifted in the manner described above (see FIG. 10) to the origin position of the color space that has the red color component, green color component and blue color component as its coordinate system by subtracting the data avR, avG and avB indicating the average values of image data of pixels in the noise-reduction target areas AR1, AG1 and AB1 of the red color component, green color component and blue color component, respectively, from the noise-reduction target pixels Rc, Gc and Bc present at the centers of the noise-reduction target areas AR1, AG1 and AB1 of the red color component, green color component and blue color component that have been obtained by color-component division processing. The thus shifted pixels Rc, Gc and Bc to undergo noise reduction are subjected to filtering processing using the filter F indicated by Equation (4).

When $D_n$ indicated by Equation (6) is subtracted from $D_{(S+n)}$ indicated by Equation (5) in the filtering processing using the filter F indicated by Equation (4), the uncorrelated noise of the CCD-RAW data is eliminated because the diagonal component of $D_{(s+n)}$ is subtracted, and the correlativity of the CCD-RAW data is maintained because the non-diagonal component is not subtracted. In other words, uncorrelated noise is removed while the correlativity of the CCD-RAW data is maintained.

By adding the data avR, avG and avB indicating the average values to the noise-reduction target pixels Rc, Gc and Bc obtained following filtering processing, the noise-reduction target pixels Rc, Gc and Bc are returned to levels corresponding to the original levels from which noise has been reduced.

In order to prevent parameters from becoming too large and, hence, prevent degradation of the image following noise reduction processing in the above-described noise reduction processing, it is preferred that parameters D(s+n)x and Dnx used in Equations (1) to (5) satisfy the relation of Equation (8) below. Here x=R, G, B holds.

$$\text{if } D_{(s+n)x} < D_{nx}, \text{ then } D_{(s+n)x} = D_{nx} \qquad \text{Equation (8)}$$

Such noise reduction processing is repeated with regard to one frame's worth of image data. Of course, if the level of color image data (the level of a pixel to undergo noise reduction) is equal to or greater than a predetermined level, noise reduction processing may be halted.

The image data that has undergone filter processing in the filter operation circuit 24 is input to an array reverse-conversion processing circuit 25. The array of image data that has been divided on a per-color-component basis is returned from the array of the color filters of CCD 1 to the original array of color filters of CCD 1 in the array reverse-conversion processing circuit 25. The output of the array reverse-conversion processing circuit 25 is the output of the noise reduction circuit 6.

Although a covariance matrix is utilized in the noise reduction processing described above, noise reduction processing can also be executed as described next without utilizing a covariance matrix.

A filter F is represented by Equation (9) in a manner similar to that of Equation (4).

$$F = \frac{D_{(s+n)X} - D_{nx}}{D_{(s+n)X}} = \frac{\sigma^2_{(s+n)X} - \alpha \cdot \sigma^2_{nX}}{\sigma^2_{(s+n)X}} \qquad \text{Equation (9)}$$

where X=R, G, B holds.

In Equation (9), D(s+n)x is a statistical quantity (a variance value, the square of a standard deviation) that contains a signal and noise; it is represented by Equation (10).

$$D_{(s+n)X} = \square^2_{(s+n)X} \qquad \text{Equation (10)}$$

where X=R, G, B holds.

Further, Dnx in Equation (9) is a statistical quantity that contains noise only and is represented by Equation (11).

$$D_{nX} = \square^2_{nX} \qquad \text{Equation (11)}$$

where X=R, G, B holds.

If the filter F based upon Equation (9) is calculated, the calculated filter and CCD-RAW data representing pixels within the noise-reduction target area are input to the filter operation circuit 24. The latter executes a filter operation (noise reduction processing) that is based upon Equation (12).

$$X_{out} = F \cdot (X_{in} - avX) + avX \qquad \text{Equation (12)}$$

where X=R, G, B holds.

In Equation (12), Xout indicates respective ones of image data of the red, green and blue color components that result after the filter operation. Further, Xin indicates respective ones of image data representing noise-reduction target pixels of the red, green and blue color components. In addition, avR, avG and avB are items of data indicating average values of image data of pixels in the noise-reduction target areas AR1, AG1 and AB1 of the red, green and blue color components, respectively, as described earlier.

Whereas color correlation is taken into consideration in the noise reduction processing executed utilizing Equations (4) to (7), it is not taken into consideration in the noise reduction processing of Equations (9) to (12). In a case where noise reduction processing has been executed taking color correlation into consideration, there are instances where the effectiveness of noise reduction cannot be expected that much in portions of an image where color correlation happens to occur accidentally. However, in the noise reduction processing that utilizes Equations (9) to (12), noise reduction is improved even in portions of an image in which color correlation occurs accidentally. This noise reduction processing is effective especially in flat image portions and monochromatic image portions. Further, since these equations are comparatively simple, the circuitry for implementing them can be reduced in scale.

Figure 16:
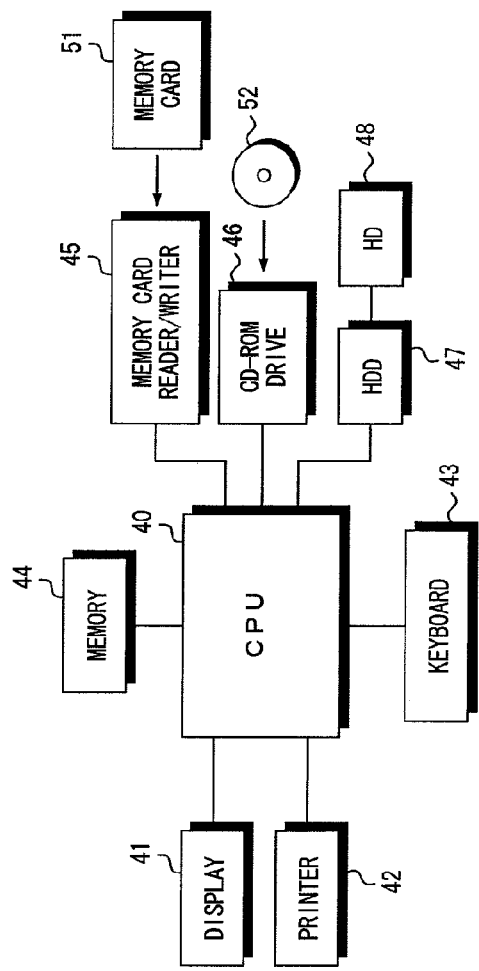
FIG. 16 is a block diagram illustrating the electrical structure of a computer system.

FIG. 16 is a block diagram illustrating the electrical structure of a computer system.

The above-described embodiment is such that noise reduction processing is executed in a digital still camera. However, noise reduction processing of CCD-RAW data can also be executed utilizing a computer system.

The computer system includes a CPU 40 to which have been connected a display unit 41, a printer 42, a keyboard 43 and a memory 44.

Also connected to the CPU 40 is a memory card reader/writer 45. By loading a memory card 51 on which CCD-RAW data has been recorded into the memory card reader/writer 45, the CCD-RAW data is read from the memory card 51 and the data is subjected to the above-described noise reduction processing. A CD-ROM drive 46 is further connected to the CPU 40. If a CD-ROM 52 on which a program for the above-described noise reduction processing has been stored is loaded into the CD-ROM drive 46, the noise reduction processing program will be read from the CD-ROM 52 and installed in the computer. Noise reduction processing can be applied to the CCD-RAW data that has been read from the memory card 51.

Further connected to the CPU 40 is a hard-disk drive 47. CCD-RAW data that has undergone noise reduction processing can be recorded on a hard disk 48 by the hard-disk drive 47.

Figure 17:
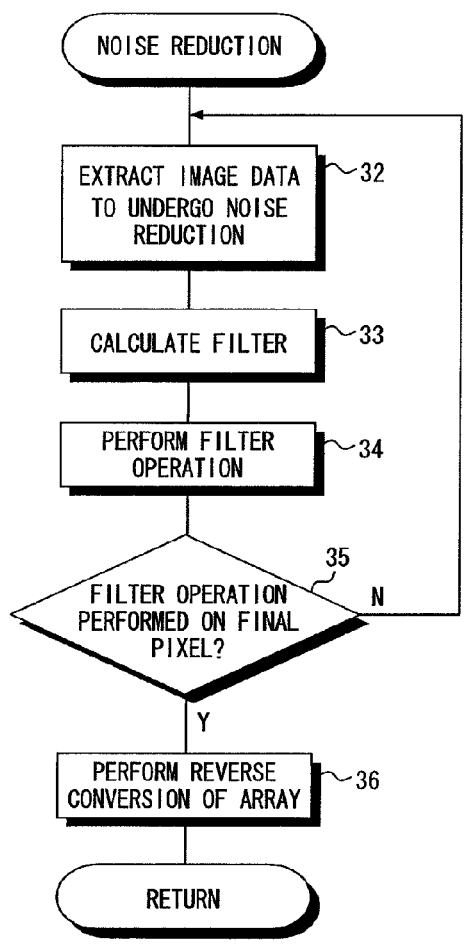
FIG. 17 is a flowchart illustrating noise reduction processing.

FIG. 17 is a flowchart illustrating noise reduction processing executed in the computer system.

As mentioned above, CCD-RAW data having red, green and blue color components is obtained from the memory card 51. Image data to undergo noise reduction is extracted from this CCD-RAW data. (step 32).

The filter F is calculated (step 33) and processing is executed using the filter F calculated, whereby uncorrelated noise is removed (step 34). The processing from step 32 to step 34 is repeated until the filter operation has been applied to the final pixel of one frame of the image (step 35). This is followed by executing the above-described processing for reverse conversion of the array (step 36). Spatial pixel processing such as the above-mentioned aperture correction is executed after uncorrelated noise is thus removed.

In the embodiment described above, a filter operation in noise reduction processing is executed using color components of the three colors. However, a filter operation can also be executed using 2 colors×2 color components. For example, using the same green color components, components are divided into a set of red and green color components and a set of blue and green color components. Calculation can be performed in the manner set forth next with regard to the set of red and green color components. It goes without saying that calculation can be performed in the same manner with regard to the set of blue and green color components.

In the case where 2 colors×2 color components are used, Equations (5) and (6) cited above are represented by Equations (13) and (14) below, respectively.

$$D_{(s+n)} = \begin{bmatrix} D_{(s+n)R} & D_{(s+n)RG} \\ D_{(s+n)GR} & D_{(s+n)G} \end{bmatrix} \qquad \text{Equation (13)}$$

$$D_n = \begin{bmatrix} D_{nR} & 0 \\ 0 & D_{nG} \end{bmatrix} \qquad \text{Equation (14)}$$

Equation (7) cited above becomes Equation (15) when Equations (9) and (14) are used.

$$\begin{bmatrix} R_{out} \\ G_{out} \end{bmatrix} = F \begin{bmatrix} R_c - avR \\ G_c - avG \end{bmatrix} + \begin{bmatrix} avR \\ avG \end{bmatrix} \qquad \text{Equation (15)}$$

Accordingly, in a case where an inverse matrix at the time of calculation of F is not found, it is preferred to so arrange it that noise reduction processing is not executed.

For example, in a case where a filter operation based upon Equation (4) is performed using Equation (13), $D_{(s+n)}^{-1}$ is represented by Equation (16) below.

$$D_{(s+n)}^{-1} = \frac{1}{AD - BC} \begin{bmatrix} D & -B \\ -C & A \end{bmatrix} \qquad \text{Equation (16)}$$

where Equation (17) below is written for $D_{(s+n)}$ indicated by Equation (6).

$$D_{(s+n)} = \begin{bmatrix} D_{(s+n)R} & D_{(s+n)RG} \\ D_{(s+n)GR} & D_{(s+n)G} \end{bmatrix} = \begin{bmatrix} A & B \\ C & D \end{bmatrix} \qquad \text{Equation (17)}$$

Assume that $\Delta = AD - BC$ holds in Equation (16). If the value of $\Delta$ approaches zero, the image represented by image data that has undergone noise reduction processing will be degraded and therefore noise reduction processing is inhibited.

FIGS. 18 to 22 illustrate a modification of the embodiment.

Figure 18:
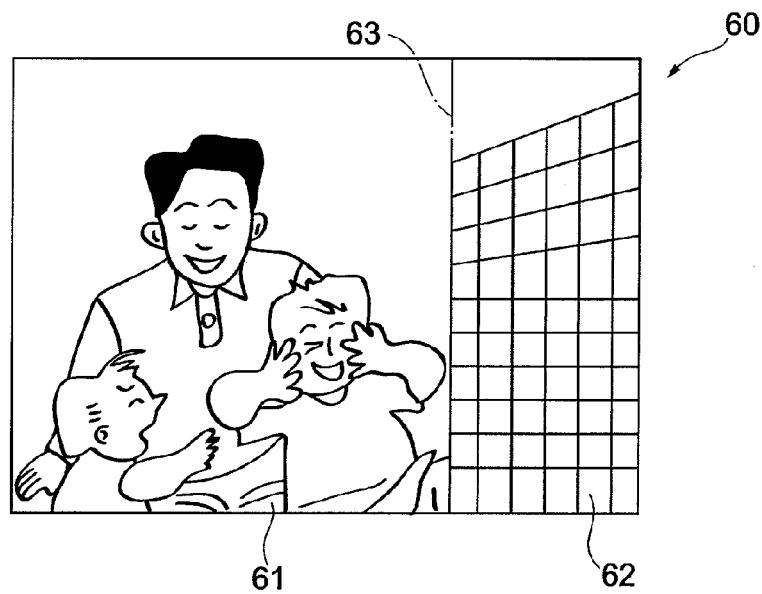
FIG. 18 illustrates an example of the image of a subject.

FIG. 18 illustrates an example of the image of a subject represented by CCD-RAW data.

Depending upon the camera angle, there are occasions where an edge 63 is produced in the image 60 of the subject. There are instances where correlativity vanishes between the level of the image data representing the image in an image area 61 on the left side of the edge 63 and the level of the image data representing the image in an image area 62 on the right side.

Figure 19:
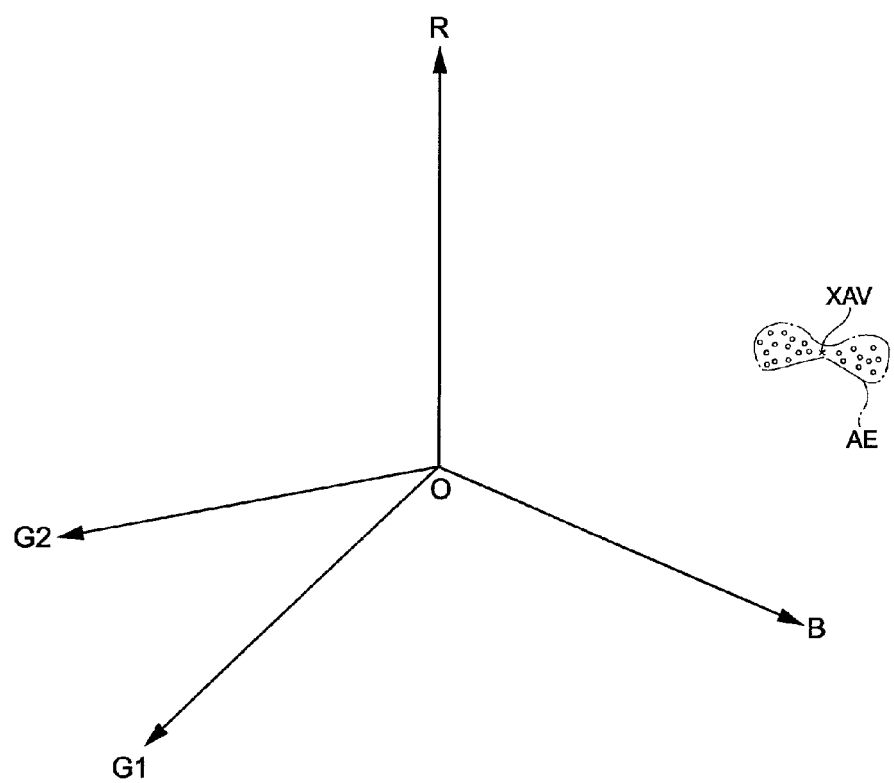
FIG. 19 illustrates the relationship between color space and image data.

FIG. 19 illustrates a level distribution of image data representing pixels within a noise-reduction target area in the color space of red, blue and green color components.

If the edge 63 is produced in the image 60 of the subject and there is no image correlativity between the areas 61 and 62 on both sides of the edge 63, as shown in FIG. 12, the distribution of image data of pixels in a noise-reduction target area AE that includes the edge 63 becomes scattered in accordance with the position of a pixel on the image 60 of the subject in the noise-reduction target area without falling within fixed bounds centered on the average value XAV of image data representing pixels in the noise-reduction target area, as mentioned above. Consequently, even if the average value XAV is shifted to the origin in color space and filtering processing is executed in the manner described above, there are instances where the correlativity of pixels in the noise-reduction target area AE cannot be maintained.

Figure 20:
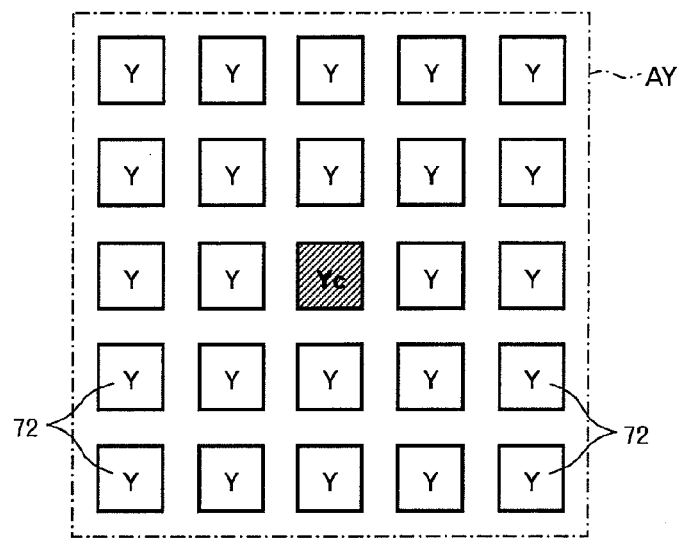
FIG. 20 illustrates an example of an area to undergo noise reduction.

FIG. 20 illustrates an example of a noise-reduction target area AY.

In this modification, CCD-RAW data is converted to luminance data and the luminance data obtained by the conversion is used.

The noise-reduction target area AY contains a total of 25 pixels 72, namely five pixels in each of the column and row directions. A pixel Yc at the center of these pixels is a pixel to undergo noise reduction processing.

Figure 21:
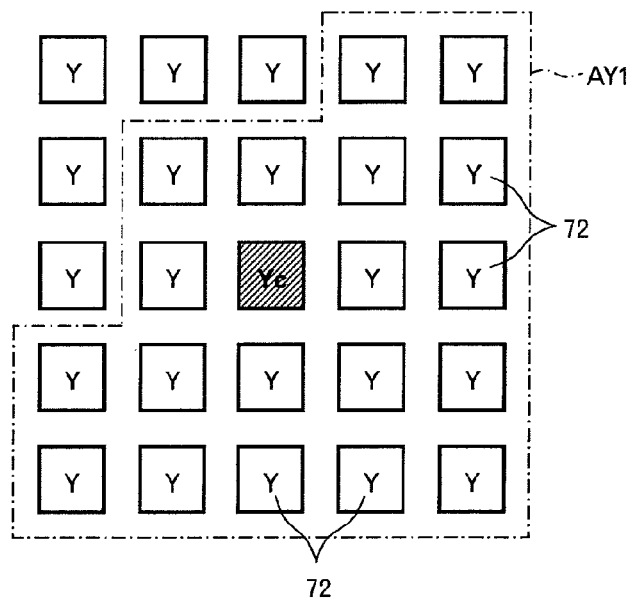
FIG. 21 illustrates an example of an area to undergo noise reduction.

In a case where the noise-reduction target area AY involves the edge 63 in the manner described above, there are instances where noise reduction processing cannot be executed while correlativity between pixels is maintained. In this modification, therefore, as shown in FIG. 21, a noise-reduction target area AY1 exhibiting correlativity is detected anew and the above-described noise reduction processing is executed using the average value of pixels in the new noise-reduction target area AY detected. Noise reduction processing can be executed while correlativity of pixels is maintained.

Figure 22:
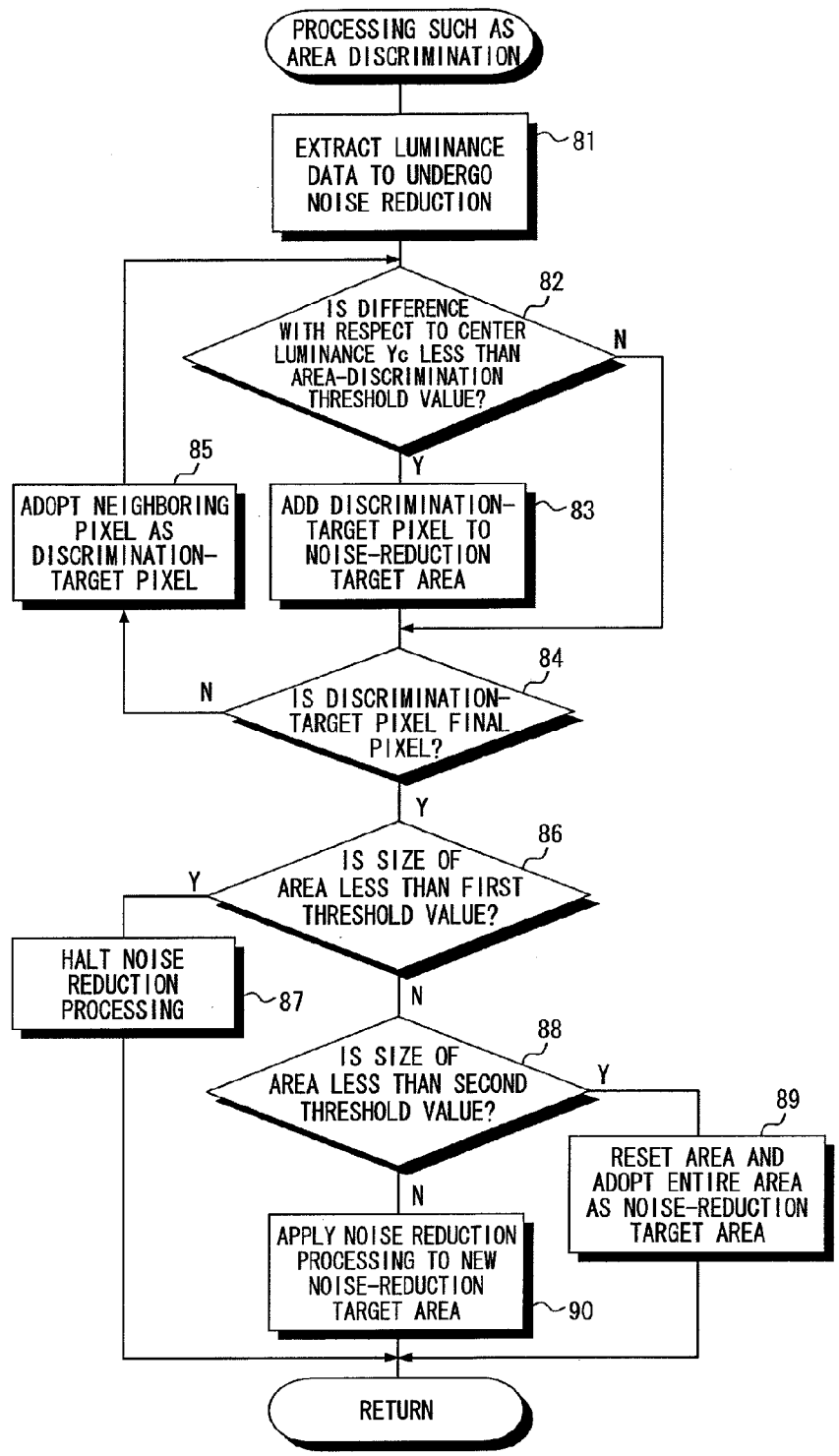

FIG. 22 is a flowchart illustrating processing for detecting a noise-reduction target area having correlativity.

Luminance data within a noise-reduction target area having five pixels in each of column and row directions is generated from CCD-RAW data (step 81; see FIG. 20). It is determined whether the difference between the level of image data of one pixel (a pixel to undergo discrimination) within the noise-reduction target area and the level of image data of the pixel Yc at the center is less than a predetermined area-discrimination threshold value (step 82). If the difference is less than the threshold value ("YES" at step 82), then it is construed that this one pixel has correlativity with respect to the center pixel Yc. Accordingly, this one pixel, which is the pixel undergoing discrimination, is added to a new noise-reduction target area (step 83). If the difference is equal to or greater than the threshold value ("NO" at step 82), then it is construed that this one pixel does not have correlativity with respect to the center pixel. This pixel, therefore, is not added to the new noise-reduction target area. The above-described processing of steps 82 and 83 is repeated with regard to all pixels to undergo discrimination (step 84). If the pixel processed is not the final pixel ("NO" at step 84), then a pixel neighboring (e.g., on the right side) the one pixel is set as a new pixel to undergo discrimination (step 85).

If the above-described processing of steps 82 and 83 has been completed for all pixels ("YES" at step 84), then the new noise-reduction target area AY1 is decided as illustrated in FIG. 21.

The method of processing changes further in accordance with the size of the new noise-reduction target area AY1 thus decided.

In a case where the size of the new noise-reduction target area AY1 is very small and is less than a first threshold value ("YES" at step 86), the number of pixels within the noise-reduction target area will be too small and there will be instances where comparatively appropriate noise reduction processing cannot be executed. As a result, noise reduction processing is halted (step 87).

If the size of the noise-reduction target area AY1 is greater than the first threshold value ("NO" at step 86) but is comparatively small and therefore is smaller than a second threshold value (first threshold value □ second threshold value) ("YES" at step 88), then, in order to enlarge the number of pixels in the noise-reduction target area, noise reduction processing is not executed using the new noise-reduction target area AY1 but is executed using a noise-reduction target area of a prescribed size (step 89).

If the size of the new noise-reduction target area AY1 is greater than the second threshold value ("NO" at step 88), then it is construed that the noise-reduction target area of the prescribed size contains an edge portion or the like. In order to eliminate the edge portion, noise reduction processing is executed using the new noise-reduction target area AY1 (step 90).

The above-described processing for deciding a new noise-reduction target area performs discrimination one pixel at a time. However, it may be so arranged that the decision is rendered for every block of a plurality of pixels.

Figure 23:
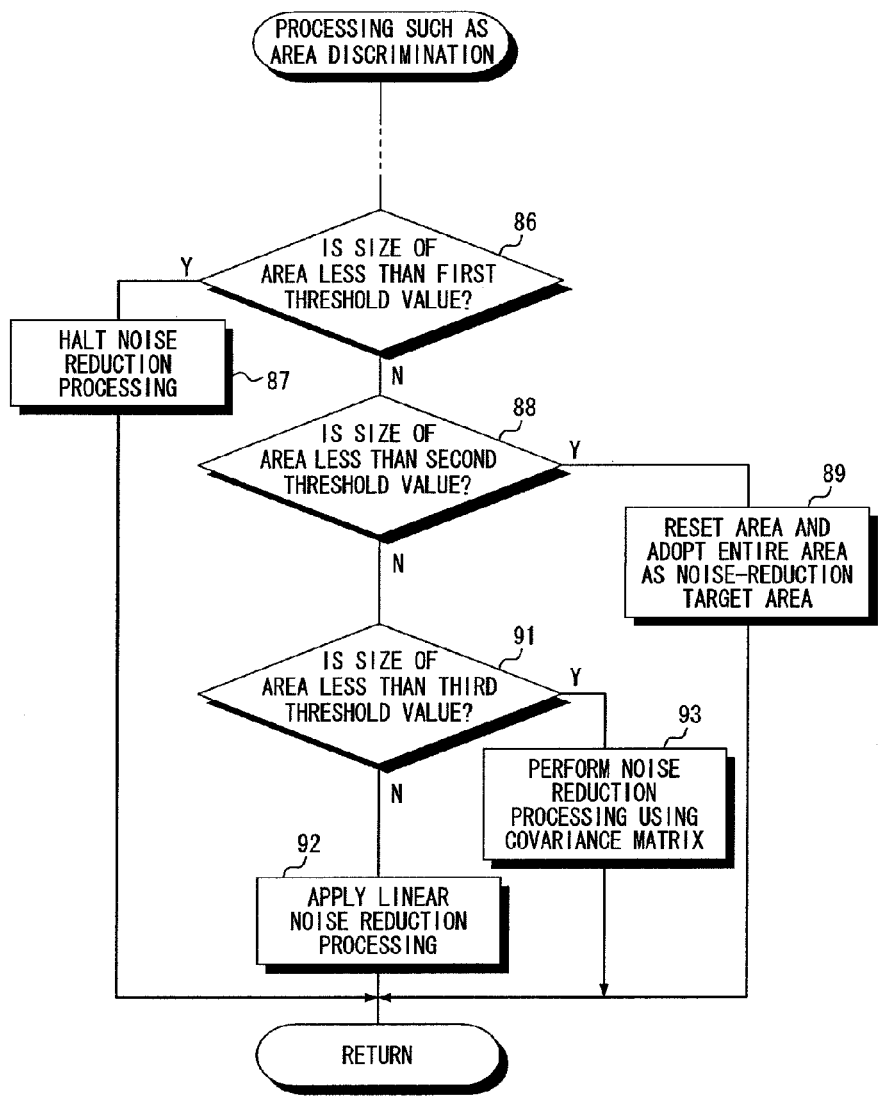

FIG. 23 is a flowchart illustrating a modification of processing shown in FIG. 22.

Processing in FIG. 23 identical with that shown in FIG. 22 is identified by like step numbers and need not be described again.

The processing illustrated in FIG. 22 is such that if the size of the area decided as the noise-reduction target area is larger than the second threshold value ("NO" at step 88), then noise reduction processing is applied to the new noise reduction area decided. In the modification illustrated in FIG. 23, however, it is decided whether the size of the area that has been decided as the noise reduction area is smaller than (larger than) a third threshold value that is larger than the second threshold value (step 91).

If the new noise reduction area that has been decided is larger than the third threshold value ("NO" at step 91), then this area is considered to be a portion having a comparatively large flatness or a portion in which change is smooth. Noise reduction processing that is based upon Equations (9) to (12) above (linear noise reduction processing) is executed in the manner described above (step 92).

If the new noise reduction area decided is smaller than the third threshold value ("YES" at step 91), then this area is considered to be a portion containing high frequency or a portion comparatively close to an edge. Noise reduction processing that is based upon Equations (4) to (7) (noise reduction processing using a covariance matrix) is executed (step 93) in the manner described above.

Figure 24:
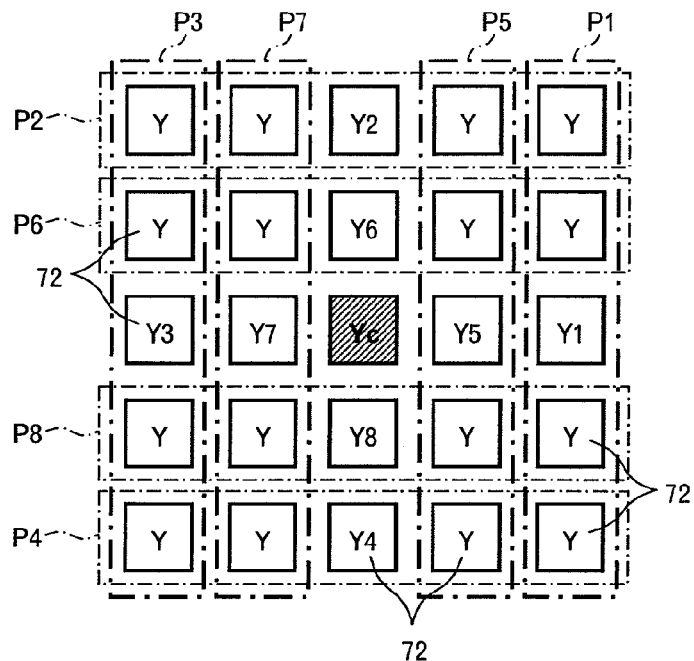
FIG. 24 illustrates an example of an area to undergo noise reduction.

FIG. 24 illustrates an example of a noise-reduction target area.

As shown in FIG. 24, pixels in a noise-reduction target area are divided into individual blocks of every row and column with the exception of the row and column that contain the center pixel Yc. That is, in the row direction, the pixels are divided into small blocks P2, P6, P8 and P4 of a first row, second row, fourth row (the third row is excluded because it contains the center pixel Yc) and fifth row, respectively. In the column direction, the pixels are divided into small blocks P3, P7, P5 and P1 of a first column, second column, fourth column (the third column is excluded because it contains the center pixel Yc) and fifth column, respectively.

Among the pixels constituting each small block, the center pixel is adopted as the representative pixel of this small block. The representative pixels of the small blocks P2, P6, P8 and P4 of the first, second, fourth and fifth rows, respectively, are Y2, Y6, Y8 and Y4, respectively. The representative pixels of the small blocks P3, P7, P5 and P1 of the first, second, fourth and fifth columns, respectively, are Y3, Y7, Y5 and Y1, respectively.

It is determined whether the difference between the level of the representative pixel of each block and the level of the center pixel Yc is less than the area-discrimination threshold value, as mentioned above. If the difference is less than the threshold value, then the entirety of the small block that contains this representative pixel is added to the new noise-reduction target area.

Figure 25:
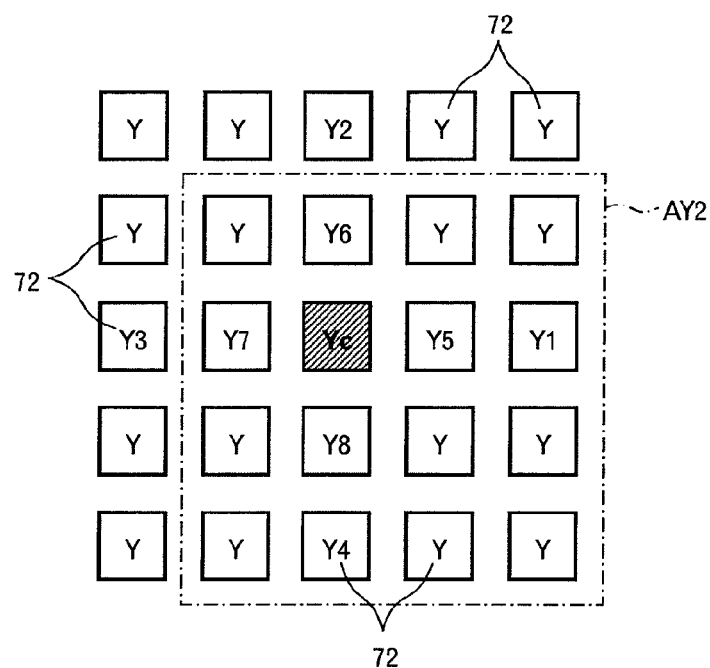
FIG. 25 illustrates an example of an area to undergo noise reduction.

FIG. 25 illustrates an example of a noise-reduction target area decided anew.

Pixels of the first row and first column have been excluded from a noise-reduction target area AY2 decided anew. The reason for this is that with regard to the representative pixels Y2 and Y3, the level difference with respect to the center pixel Yc has been determined to be equal to or greater than the predetermined area-discrimination threshold value. With regard to the representative pixels Y6, Y8, Y4, Y7, Y5 and Y1 of the small blocks of the other rows and columns, the level difference relative to the center pixel is less than the predetermined area-discrimination threshold value and therefore the pixels contained in each of these small blocks are contained in the noise-reduction target area AY2.

Thus, processing is simplified by discriminating a noise-reduction target area on a per-small-block basis.

In the embodiment set forth above, it is determined whether the difference between the level of the representative pixel of each small block and the level of the pixel Yc at the center is less than an area-discrimination threshold value. However, whether the difference between an average level of pixels constituting a small block and the level of the pixel Yc at the center, rather than the difference between the level of the representative pixel of each small block and the level of the pixel Yc at the center, is less than the area-discrimination threshold value may be discriminated.

Figures 26, 27:
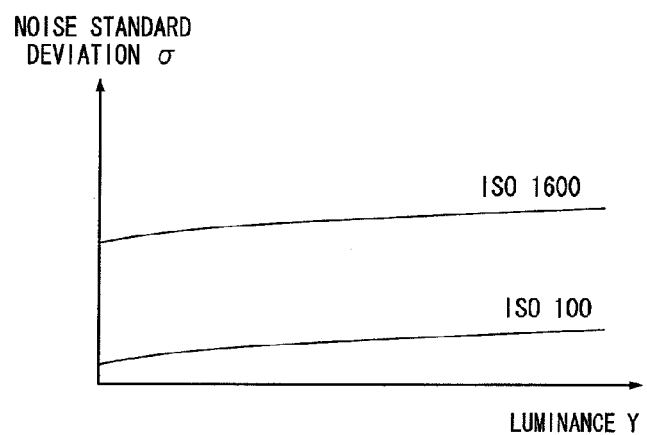
FIG. 26 illustrates an example of pixels constituting a small block.
FIG. 27 illustrates the relationship between shooting sensitivity and luminance.

FIG. 26 illustrates an example of five pixels constituting a small block.

As mentioned above, the small block includes five pixels Xi, Xj, Xk, Xl, Xm. Although these pixels Xi, Xj, Xk, Xl, Xm have been arrayed in a single horizontal row, they may also be arrayed in a single vertical row, as described earlier.

If we let the levels of these pixels Xi, Xj, Xk, Xl, Xm be represented by Xi, Xj, Xk, Xl, Xm, respectively, then the average level B1 of the pixels Xi, Xj, Xk, Xl, Xm constituting the small block is represented by Equation (18), where a0 to a4 are weighting coefficients.

$$B1 = a0 \cdot Xi + a1 \cdot Xj + a2 \cdot Xk + a3 \cdot Xl + a4 \cdot Xm \quad \text{Eq. (18)}$$

Thus, it may be so arranged that discrimination processing as to whether to adopt an area as a noise-reduction target area is executed based upon the difference between the average level of a small block and the center pixel Yc. Since the average level of pixels constituting a small block is used, the amount of noise in pixels also is averaged. In a case where the difference between the level of representative pixels of small blocks and the level of the center pixel Yc has been calculated, the noise at the level of the representative pixels stands out. Even if the difference between the level of the representative pixel and the center pixel Yc is not calculated accurately, a comparatively accurate difference value can be calculated by using the average level. A noise-reduction target area can be defined comparatively accurately.

Figure 28:
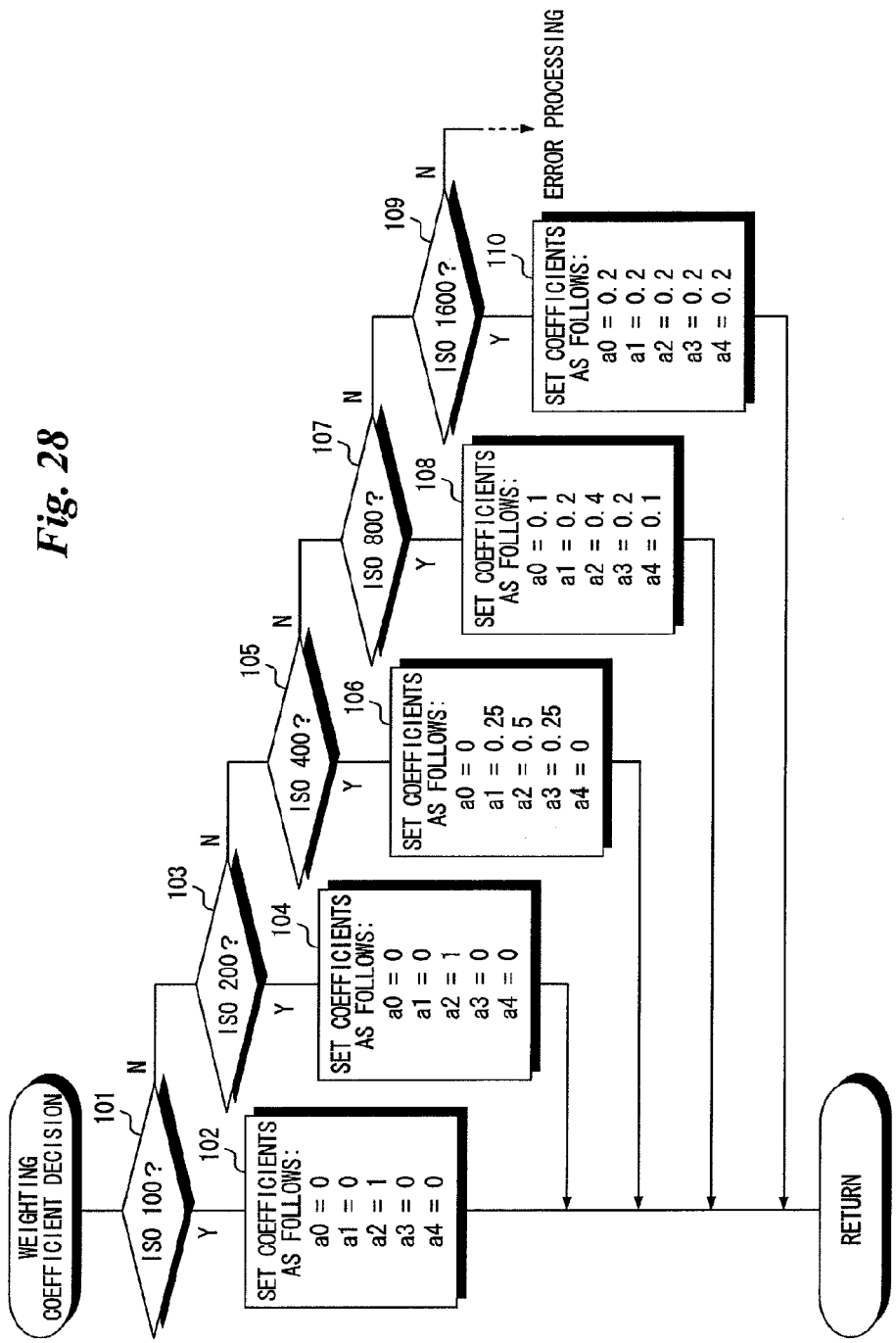
FIG. 28 is a flowchart illustrating a process for deciding weighting coefficients.

FIGS. 27 and 28 illustrate a modification.

In Equation (18) above, there is no particular discussion concerning the weighting coefficients a0 to a4. In the modification described below, the weighting coefficients a0 to a4 are decided in such a manner that the higher the sensitivity of imaging, the more the average level B1 in Equation (18) is averaged.

FIG. 27 illustrates the relationship between level Y of luminance data and standard deviation □ of noise possessed by the luminance data.

Luminance data Y (image data) obtained by low-sensitivity imaging such as ISO (International Standards Organization) 100 has a comparatively small amount of noise and a noise standard deviation □ that is also small. By contrast, luminance data Y obtained by high-sensitivity imaging such as ISO 1600 has a comparatively large amount of noise and a noise standard deviation □ that is also large.

Since the amount of noise is large in case of high-sensitivity imaging, there are instances where a noise reduction area cannot be decided accurately owing to the effects of noise if a pixel for which the difference in level with respect to the level of the center pixel Yc is calculated is a representative pixel in a small block. By contrast, since the amount of noise is comparatively small in case of low-sensitivity imaging, the effects of noise are not that great even if a pixel for which the difference in level with respect to the level of the center pixel Yc is calculated is a representative pixel in a small block. Accordingly, the weighting coefficients are decided in such a manner that the level for calculating the difference with respect to the level of the center pixel Yc is the average level of pixels constituting the small block, with the level approaching the level of a representative pixel of the small block (e.g., the pixel at the center of the small block) as the sensitivity of imaging declines.

FIG. 28 is a flowchart illustrating processing for deciding weighting coefficients.

In a case where ISO sensitivity of an exposure is 100 ("YES" at step 101) and also in a case where it is 200 ("YES" at step 103), it can be construed that there is no noise in both cases. Accordingly, only the weighting coefficient a2 regarding a representative pixel of a small block is made 1 and the other coefficients a0, a1, a3, a4 are made 0 (steps 102, 104) in such a manner that the difference between the level of the representative pixel of the small block and the level of the pixel Yc at the center will be calculated.

In a case where ISO sensitivity of an exposure is 400 ("YES" at step 105), noise increases slightly, the weighting coefficient a2 regarding the representative pixel (center pixel) of the small block is made comparatively large (a2=0.5), the weighting coefficients a1, a3 adjacent both sides of the representative pixel are made comparatively small (a1, a3=0.25), and the other pixel weighting coefficients a0, a4 are made 0 (step 106).

In a case where ISO sensitivity of an exposure is 800 ("YES" at step 107), noise increases further. Accordingly, the weighting coefficient a2 regarding the representative pixel (center pixel) of the small block is made 0.4, the weighting coefficients a1, a3 adjacent both sides of the representative pixel are made 0.2, and the other pixel weighting coefficients a0, a4 are made 0.1 (step 108).

In a case where ISO sensitivity of an exposure is 1600 ("YES" at step 109), noise is great. Accordingly, the weighting coefficients a0 to a4 are all made equal, i.e., 0.2, in such a manner that the difference between the average level and the level of the pixel Yc at the center will be calculated (step 110).

Thus, a noise-reduction target area can be decided comparatively accurately in case of both low-sensitivity imaging and high-sensitivity imaging.

Figure 29:
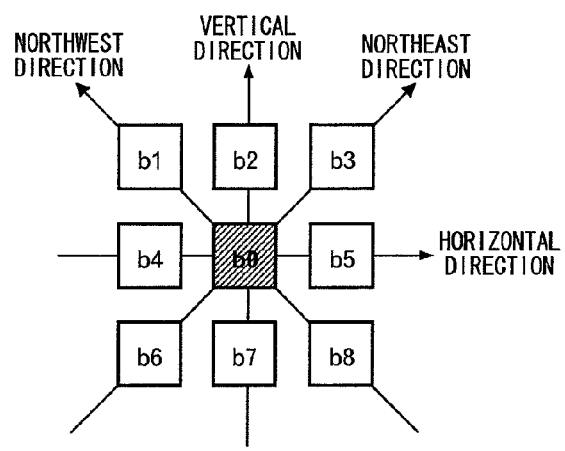
FIG. 29 illustrates an example of a pixel array.
Figure 30:
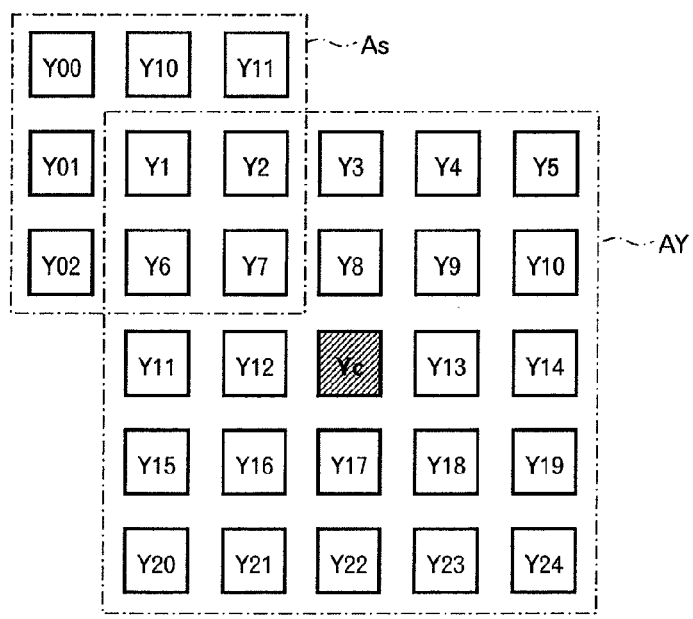
FIG. 30 illustrates an example of a pixel array.

FIGS. 29 and 30, which illustrate a modification, show pixel arrays.

In a case where a noise-reduction target area is decided one pixel at a time, the difference in level with respect to the center pixel Yc is calculated. However, in a case where a target pixel for which the level difference with respect to the center pixel Yc is calculated contains a large amount of noise, there are instances where the level difference increases or, conversely, decreases owing to the effects of noise. Consequently, there are occasions where an accurate level difference cannot be calculated. This embodiment calculates the direction in which the slope of a target pixel, for which the level difference with respect to the center pixel Yc is calculated, is small (namely the direction in which a change in the image is small, or the direction in which the image is flat and smooth).

FIG. 29 illustrates pixels around a target pixel.

Pixels b0 to b8 in three rows and three columns are illustrated. A center pixel b0 is a target pixel. Pixels are arranged around a central pixel b0, namely in a vertical direction, horizontal direction, northwest direction and northeast direction. High-frequency components are extracted by a high-pass filter in each of these directions using Equations (19) to (22). Equation (19) is utilized in a case where high-frequency components in the horizontal direction are extracted, Equation (20) is utilized in a case where high-frequency components in the vertical direction are extracted, Equation (21) is utilized in a case where high-frequency components in the northwest direction are extracted, and Equation (22) is utilized in a case where high-frequency components in the northeast direction are extracted.

$$HPF_H = |hpf_0 \cdot b_4 + hpf_1 \cdot b_0 + hpf_2 \cdot b_5| \quad \text{Eq. (19)}$$

$$HPF_V = |hpf_0 \cdot b_2 + hpf_1 \cdot b_0 + hpf_2 \cdot b_7| \quad \text{Eq. (20)}$$

$$HPF_{NW} = |hpf_0 \cdot b_1 + hpf_1 \cdot b_0 + hpf_2 \cdot b_8| \quad \text{Eq. (21)}$$

$$HPF_{NE} = |hpf_0 \cdot b_3 + hpf_1 \cdot b_0 + hpf_2 \cdot b_6| \quad \text{Eq. (22)}$$

The direction in which the absolute values of the levels of high-frequency components thus extracted are smallest is the direction in which the slope of the target pixel is small. A mean level LPF of three pixels along this direction is calculated according to Equation (23).

$$LPF = (bx + by + bz)/3 \quad \text{Eq. (23)}$$

The difference between the mean level LPF and the level of the center pixel Yc, and the noise-reduction target area is decided based upon the difference value. Thus the difference between the mean level LPF and the level of the center pixel Yc is calculated. Therefore, even if the target pixel contains a comparatively significant amount of noise, the noise is averaged and the influence that the noise has upon the difference value can be suppressed. In particular, since the direction in which the slope of the pixel is small has been detected, the existence of edges and the like can be neglected in comparison with a case where use is made of the average value of pixel levels in the direction in which the slope is large. This makes it possible to better suppress the effects of noise (e.g., if three pixels are averaged, the standard deviation □ is 1/$\sqrt{3}$). The threshold value for edge discrimination can also be lowered, and even edges not found in the prior art can be found.

FIG. 30 illustrates the manner in which it is determined whether the target pixel Y1 is included in the noise-reduction target area.

As mentioned above, the direction in which the slope of the target pixel Y1 is low is detected using pixels Y00, Y10, Y01, Y2, Y02, Y6, Y7 (these pixels are indicated by As in FIG. 30) in the vertical, horizontal, northwest and northeast directions of the target pixel Y1. The average of the three pixels arrayed along the detected direction in which the slope is small is calculated. The difference between the calculated average level and the level of the center pixel Yc is then calculated. If the difference calculated is less than a threshold value, then the target pixel Y1 is contained in the noise-reduction target area. Whether the pixels Y2 to Y24 other than the target pixel Y1 fall in the noise-reduction target area is determined in a similar manner.

In the foregoing embodiment, the average of three pixels arrayed along the direction in which the slope of the target pixel Y1 is small is calculated and then the difference between the calculated average level and the level of the center pixel Yc per se is calculated. If the difference calculated in less than the threshold value, then it is judged that the target pixel Y1 is contained in the noise-reduction target area. However, it may be so arranged that with regard to the center pixel Yc as well, the pixel Yc is adopted as the center in a manner similar to the target pixel Y1, the direction in which the slope is small is detected using the pixel Yc and the pixels Y7 to Y9, Y12, Y13 and Y16 to Y18 around the pixel Yc, and the average of three pixels arrayed along the detected direction in which the slope is small (the three pixels are Y8, Yc and Y17 in a case where the slope in the vertical direction is small) is calculated. It may be so arranged that if the difference between the calculated average level of the pixel Yc and the average level of the target pixel Y1 is calculated and the calculated difference is less than a threshold value, then the target pixel Y1 is judged to fall within the noise-reduction target area.

Figure 31:
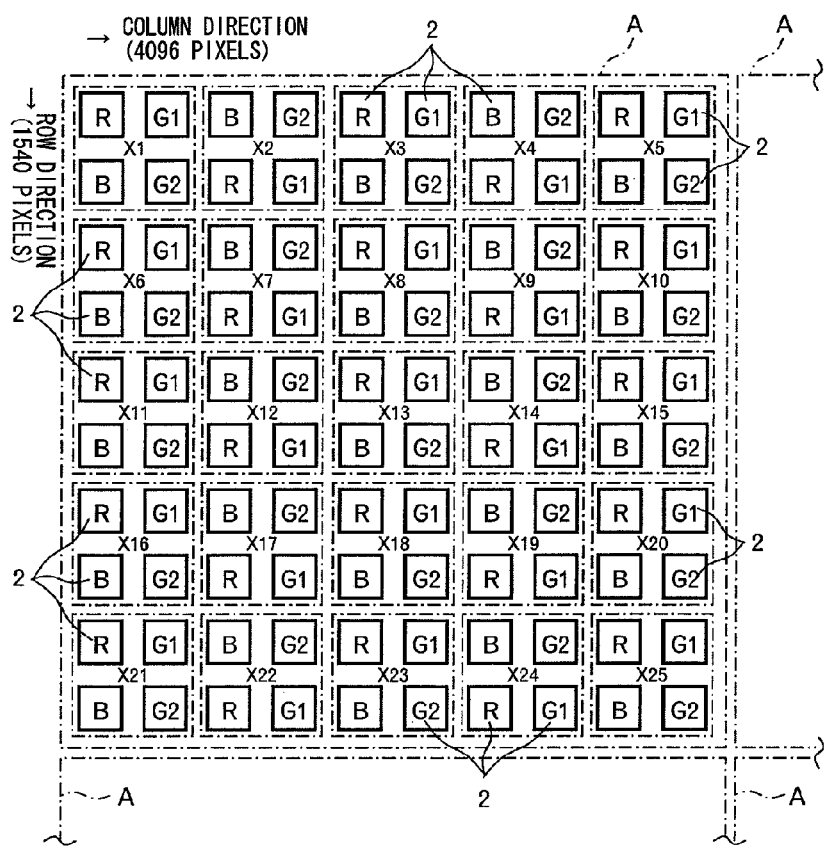
FIG. 31 illustrates part of the photoreceptor surface of a CCD.
Figure 32:
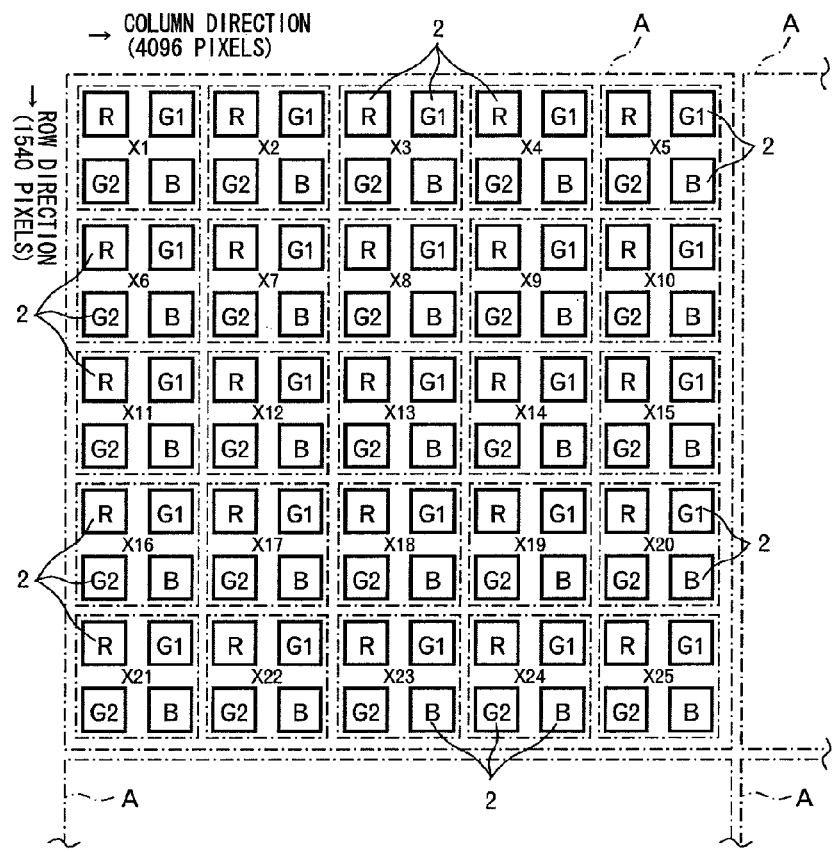
FIG. 32 illustrates part of the photoreceptor surface of a CCD.

It goes without saying that the embodiment of the present invention is not limited to the above-described filter array and can be applied to any filter array. For example, as shown in FIG. 31, the embodiment is also applicable to a so-called honeycomb array in which a (4n+1)th column, (4n+2)th column, (4n+3)th column and (4n+4)th column are provided in odd-numbered rows with filters having characteristics that pass a red color component, first green color component, blue color component and second green color component, respectively, and the (4n+1)th column, (4n+2)th column, (4n+3)th column and (4n+4)th column are provided in even-numbered rows with filters having characteristics that pass a blue color component, second green color component, red color component and first green color component, respectively. Further, as shown in FIG. 32, the embodiment is also applicable to a so-called Bayer array in which odd-numbered rows and odd-numbered columns are provided with filters having a characteristic that passes the red color component, odd-numbered rows and even-numbered columns are provided with filters having a characteristic that passes the first green color component, even-numbered rows and odd-numbered columns are provided with filters having a characteristic that passes the second green color component, and even-numbered rows and even-numbered columns are provided with filters having a characteristic that passes the blue color component. Thus, this embodiment is applicable if the array of color filters is systematic.

Figure 33:
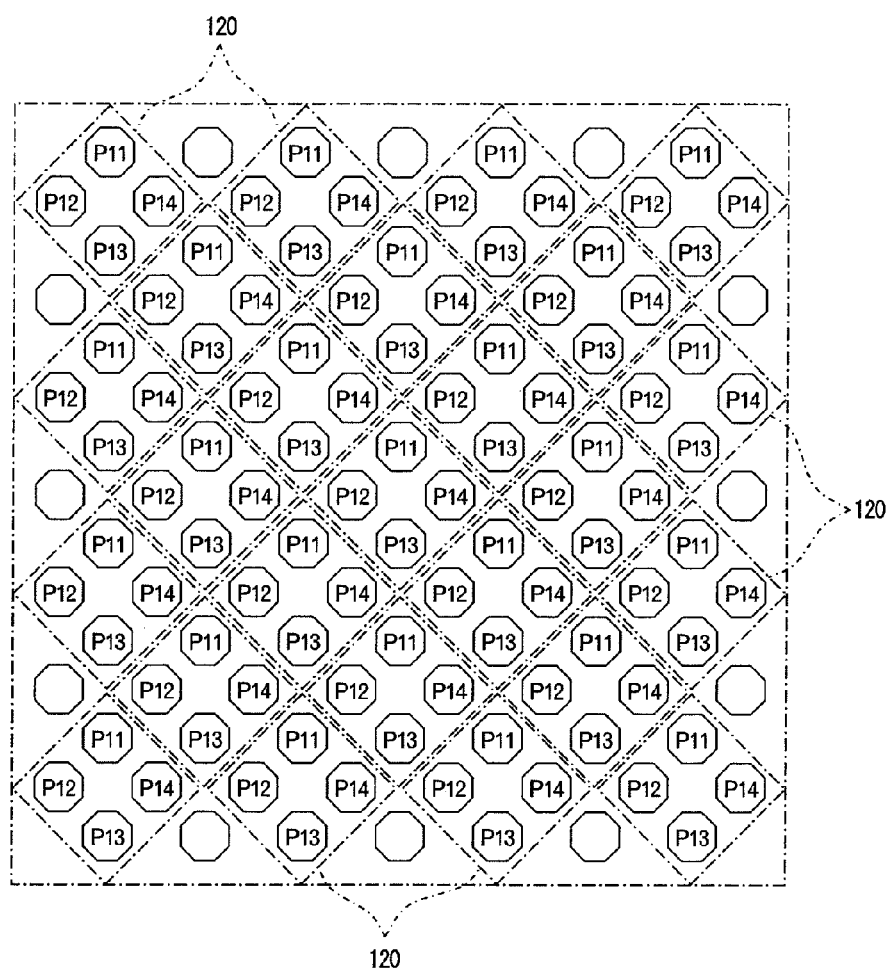
FIG. 33 illustrates part of the photoreceptor surface of a CCD.

FIG. 33 illustrates part of the photoreceptor surface of a CCD. This CCD is for monochrome imaging.

Arrayed on the surface of the CCD are a multiplicity of photodiodes P11 to P14. In odd-numbered columns, the photodiodes P11 to P14 are provided in even-numbered rows, and in even-numbered columns, the photodiodes P11 to P14 are provided in odd-numbered rows. However, it goes without saying that it may be arranged such that in odd-numbered columns, the photodiodes are provided in odd-numbered rows, and in even-numbered columns, the photodiodes are provided in even-numbered rows, or such that photodiodes are provided in all rows and columns.

In this embodiment, four photodiodes P11 to P14 close together in the column and row directions are handled as one set 120 (it goes without saying that the number need not necessarily be four). Noise reduction processing is executed with a substantially square zone (noise-reduction target area A) containing 25 of the sets 120 serving as a unit. Although the physical positions (spatial positions) of the four photodiodes P11 to P14 that construct each set 120 are different, in these physical positions are regarded as being the same in this embodiment.

If the image of a subject is sensed using such a CCD, the CCD will output CCD-RAW data representing the image of the subject. The CCD-RAW data is output serially one row's worth at a time in accordance with the array of photodiodes P11 to P14.

Figure 34:
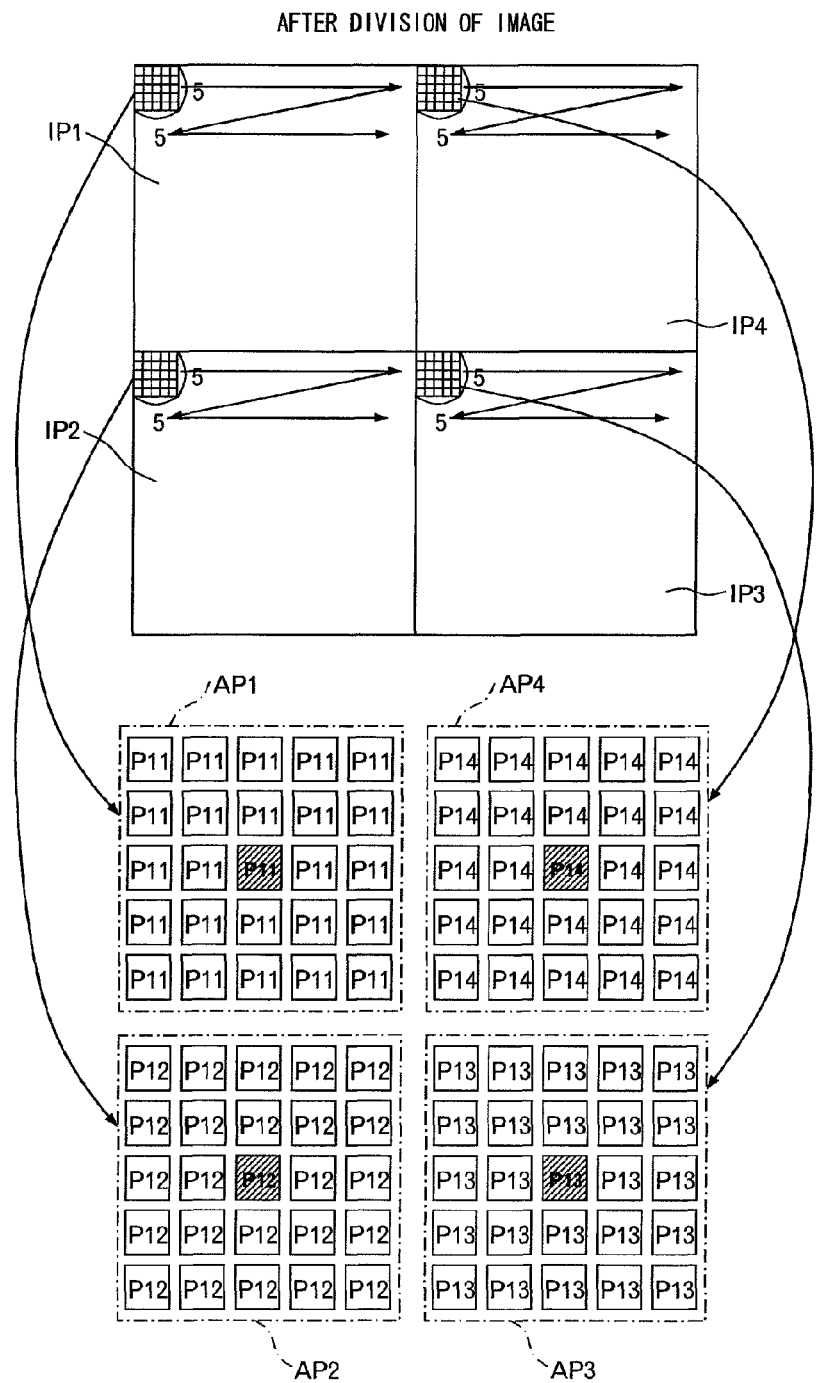
FIG. 34 illustrates pixel division processing.

FIG. 34 illustrates how an image looks after image division.

In this embodiment, data extraction processing (pixel division processing) of CCD-RAW data is executed in such a manner that an array of pixels (this pixel array corresponds to the array of photodiodes P1 to P4 in FIG. 33) of an image represented by the CCD-RAW data that has been output from the CCD in the manner described above will represent an image represented by signal charge that has been stored in each of the photodiodes of the photodiodes P11 to P14 that construct the single set 120.

The image represented by signal charge that has been stored in each of the photodiodes P11, P12, P13 and P14 is composed of image portions of an upper-left area IP1, lower-left area IP2, lower-right area IP3 and upper-right area IP4 of FIG. 34.

The areas of five pixels in each of the column and row directions in respective ones of these image portions IP1 to IP4 become noise-reduction target areas AP1 to AP4. The area obtained by combining these noise-reduction target areas AP1 to AP4 corresponds to the noise-reduction target area 120 shown in FIG. 33.

Pixels AP1c, AP2c, AP3c and AP4c at the centers of the noise-reduction target areas AP1 to AP4, respectively, are pixels that are to undergo noise reduction. Noise reduction processing of the central pixels AP1c, AP2c, AP3c and AP4c is executed utilizing the pixels (image data) present in the noise-reduction target areas AP1 to AP4 in a manner similar to that described above. When noise reduction processing of the central pixels AP1c, AP2c, AP3c and AP4c of the noise-reduction target areas AP1 to AP4, respectively, ends, the noise-reduction target areas AP1 to AP4 are each shifted one pixel to the right and noise reduction processing is applied to the pixels AP1c, AP2c, AP3c and AP4c located at the centers of respective ones of the noise-reduction target areas AP1 to AP4 thus shifted. Shifting of the noise-reduction target areas and noise reduction processing are thus repeated for one frame of the image.

As mentioned above, the positions of four pixels adjoining one another in the column and row directions in the CCD 1 differ physically but the pixels are regarded as being at the same position in this embodiment. This means that a pixel within the noise-reduction target areas AP1 to AP4 can be expressed by $Xn=(P11n, P12n, P13n, P14n)$. (Since the pixels within the noise-reduction target areas AP1 to AP4 are 25 in number, $n=1$ to 25 holds.)

It will be understood that by adopting the foregoing stipulations, noise reduction processing can be executed in a manner similar to that described above with reference to FIG. 9 onward. Equations (5) to (7), however, become Equations (24) to (26) below.

$$D_{(s+n)} = \begin{bmatrix} D_{(s+n)P11} & D_{(s+n)P11P12} & D_{(s+n)P11P13} & D_{(s+n)P11P14} \\ D_{(s+n)P12P11} & D_{(s+n)P12} & D_{(s+n)P12P13} & D_{(s+n)P12P14} \\ D_{(s+n)P13P11} & D_{(s+n)P13P12} & D_{(s+n)P13} & D_{(s+n)P13P14} \\ D_{(s+n)P14P11} & D_{(s+n)P14P12} & D_{(s+n)P14P13} & D_{(s+n)P14} \end{bmatrix} \quad \text{Equation (24)}$$

$$D_n = \begin{bmatrix} D_{nP11} & 0 & 0 & 0 \\ 0 & D_{nP12} & 0 & 0 \\ 0 & 0 & D_{nP13} & 0 \\ 0 & 0 & 0 & D_{nP14} \end{bmatrix} \quad \text{Equation (25)}$$

$$\begin{bmatrix} P11_{out} \\ P12_{out} \\ P13_{out} \\ P14_{out} \end{bmatrix} = F \begin{bmatrix} P11_c - avP11 \\ P12_c - avP12 \\ P13_c - avP13 \\ P14_c - avP14 \end{bmatrix} + \begin{bmatrix} avP11 \\ avP12 \\ avP13 \\ avP14 \end{bmatrix} \quad \text{Equation (26)}$$

In the foregoing embodiment, the invention is described with regard to a monochrome CCD. However, noise reduction processing can be executed in similar fashion also in each of CCDs on three chips.

As many apparently widely different embodiments of the present invention can be made without departing from the spirit and scope thereof, it is to be understood that the invention is not limited to the specific embodiments thereof except as defined in the appended claims.

What is claimed is:

1. A noise reduction apparatus comprising:
    a dividing device for dividing color image data representing one frame of a color image into a plurality of blocks in which pixels are spatially close together;
    a calculation device for calculating a difference between a dispersion value of block color image data representing an image in a block obtained by division by said dividing device and a dispersion value of noise in the block color image data;
    a noise removal device for removing noise in the color image data based upon the difference calculated by said calculation device; and
    a control device for exercising control in such a manner that calculation processing by said calculation device and noise removal processing by said noise removal device will be repeated with regard to the color image data representing one frame of the color image.

2. A method of controlling a noise reduction apparatus, comprising the steps of:
    dividing color image data representing one frame of a color image into a plurality of blocks in which pixels are spatially close together;
    calculating a difference between a dispersion value of block color image data representing an image in a block obtained by division and a dispersion value of noise in the block color image data;

removing noise in the color image data based upon the difference calculated; and repeating difference calculation processing and noise removal processing with regard to the color image data representing one frame of the color image.

3. A non-transitory computer readable medium having stored there on a program that causes a processor of a noise removal apparatus to execute the steps of:

dividing color image data representing one frame of a color image into a plurality of blocks in which pixels are spatially close together;

calculating a difference between a dispersion value of block color image data representing an image in a block obtained by division and a dispersion value of noise in the block color image data;

removing noise in the color image data based upon the difference calculated; and repeating difference calculation processing and noise removal processing with regard to the color image data representing one frame of the color image.

* * * * *